United States Patent [19]
Seki et al.

[11] Patent Number: 5,444,618
[45] Date of Patent: Aug. 22, 1995

[54] APPARATUS AND METHOD FOR TOPOGRAPHIC PROCESSING

[75] Inventors: Shinji Seki, Katsuta; Makoto Ibusuki, Hitachi; Yasuei Nomoto, Katsuta, all of Japan

[73] Assignees: Hitachi, Ltd., Tokyo; Hitachi Information Control Systems, Inc., Ibaraki, both of Japan

[21] Appl. No.: 918,592

[22] Filed: Jul. 24, 1992

[30] Foreign Application Priority Data

Jul. 25, 1991 [JP] Japan ................. 3-186107

[51] Int. Cl.⁶ ............ G06F 17/00; G06G 7/48
[52] U.S. Cl. ................. 364/420; 364/443
[58] Field of Search .......... 364/420, 443, 457; 382/56

[56] References Cited

U.S. PATENT DOCUMENTS

| | | | |
|---|---|---|---|
| 4,520,506 | 5/1985 | Chan et al. | 382/56 |
| 4,685,068 | 8/1987 | Greco et al. | |
| 4,698,759 | 10/1987 | Eliason et al. | 364/420 |
| 4,729,127 | 3/1988 | Chan et al. | 382/56 |
| 4,737,927 | 4/1988 | Hanabusa et al. | 364/443 |
| 4,847,788 | 7/1989 | Shimada | 364/522 |
| 4,876,651 | 10/1989 | Dawson et al. | 364/449 |
| 5,057,835 | 10/1991 | Factor et al. | 364/443 |
| 5,084,822 | 1/1992 | Hayami | 364/443 |
| 5,161,886 | 11/1992 | De Jong et al. | 364/443 |
| 5,220,360 | 6/1993 | Verdooner et al. | 351/212 |
| 5,237,323 | 8/1993 | Saito et al. | 364/443 |

FOREIGN PATENT DOCUMENTS

| | | |
|---|---|---|
| 1024272 | 2/1958 | Denmark . |
| 63-098780 | 9/1988 | Japan . |
| 9014627 | 11/1990 | WIPO . |

OTHER PUBLICATIONS

NEC Research and Development, No. 73, Apr. 1984, Tokyo JP pp. 66–75 Kasahara et al 'WING: A Geographic Information System for Supporting Regional Analysis and Facility management' *abstract; FIGS. 1,2,5,9*.

Conference Papers from the 1989 Power Industry Computer Application Conference, May 1989, Seattle, US pp. 135–140 Trudeau et al. 'Integrating AM/FM Maps with Distribution SCADA' *p. 138, left column, line 23—right column, line 20*.

*Primary Examiner*—Gail O. Hayes
*Assistant Examiner*—J. L. Hazard
*Attorney, Agent, or Firm*—Antonelli, Terry, Stout & Kraus

[57] ABSTRACT

For topographic processing, a plurality of maps are stored, the maps being of different scales and therefore being based on different amounts of map data. The user selects a map of appropriate scale, and can then select a part, for example a line, on which appropriate analysis is to be made, such as obtaining a cross section based on contour data of the map. The map data corresponding to the selected part of the map is investigated and, where it does not meet an appropriate criterion, the data of a part of a map of different scale is investigated, the part of the two maps corresponding to the same region. Hence information can be derived which meets the appropriate criterion. Thus, when obtaining a cross section, if the amount of data for a region of a map is insufficient for a satisfactory cross section to be obtained, the data of the same region of a map of larger scale is analyzed, so that a satisfactory cross section can be achieved. The processing is also applicable to the investigation of lines of sight, using the map data.

15 Claims, 26 Drawing Sheets

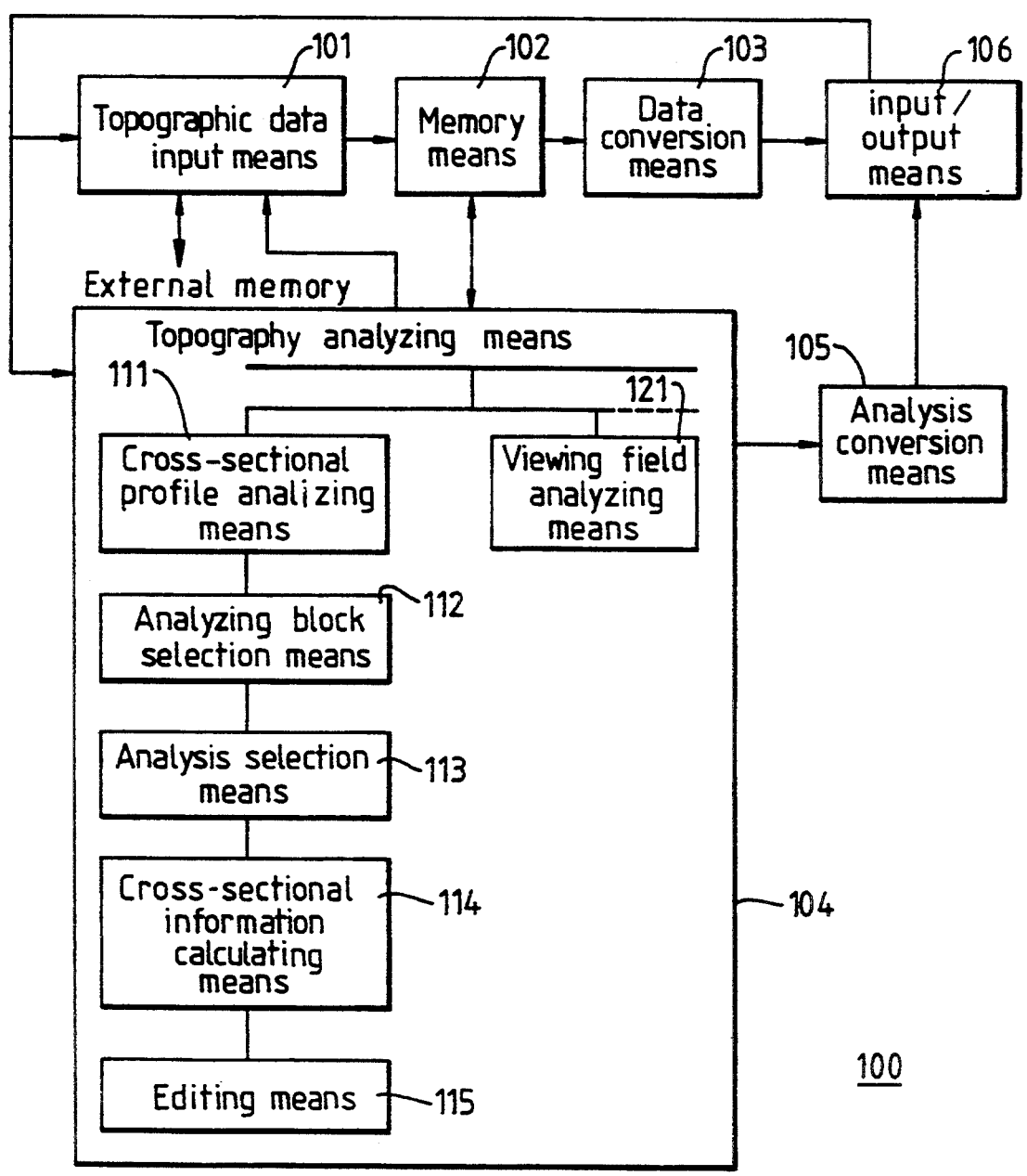

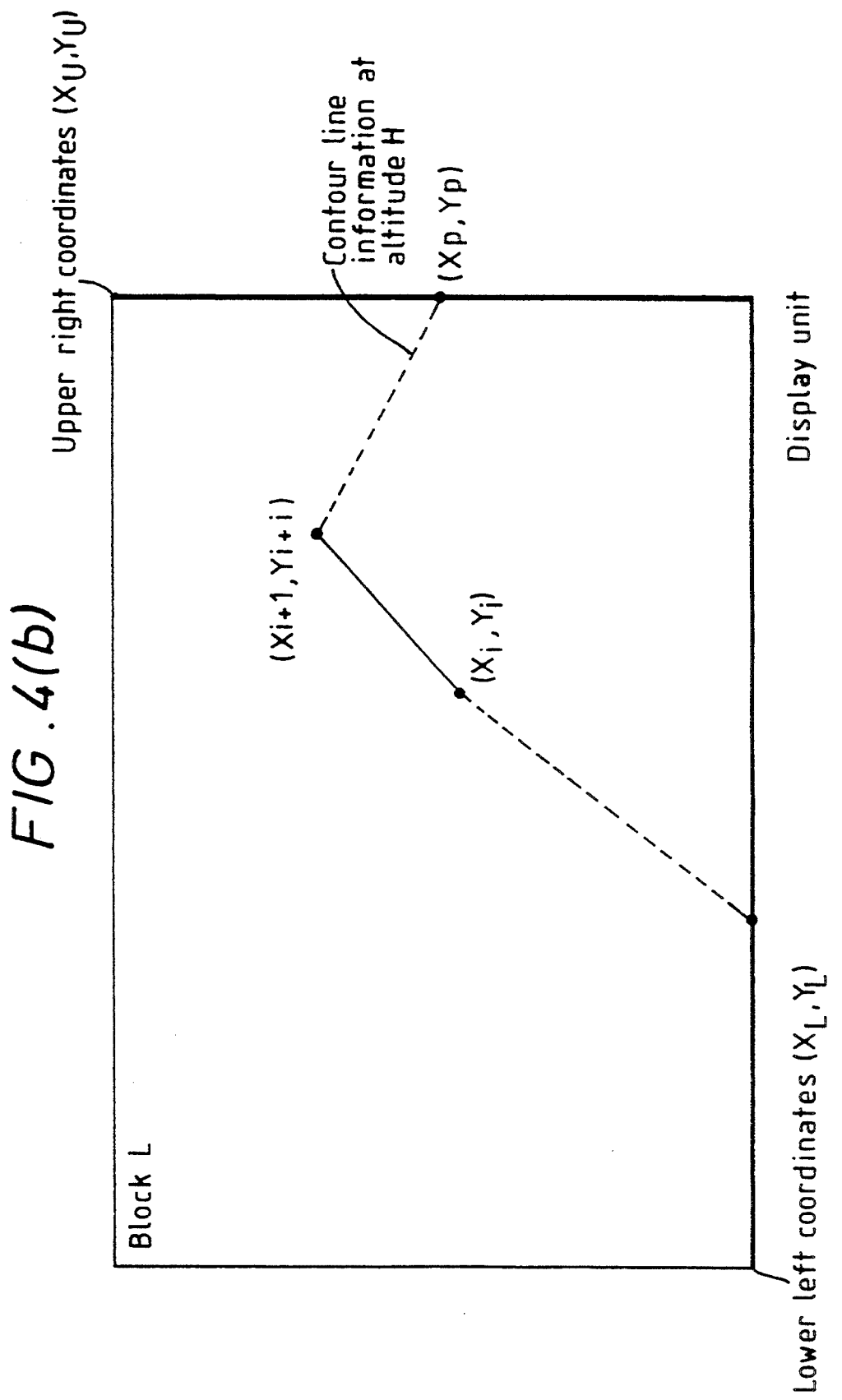

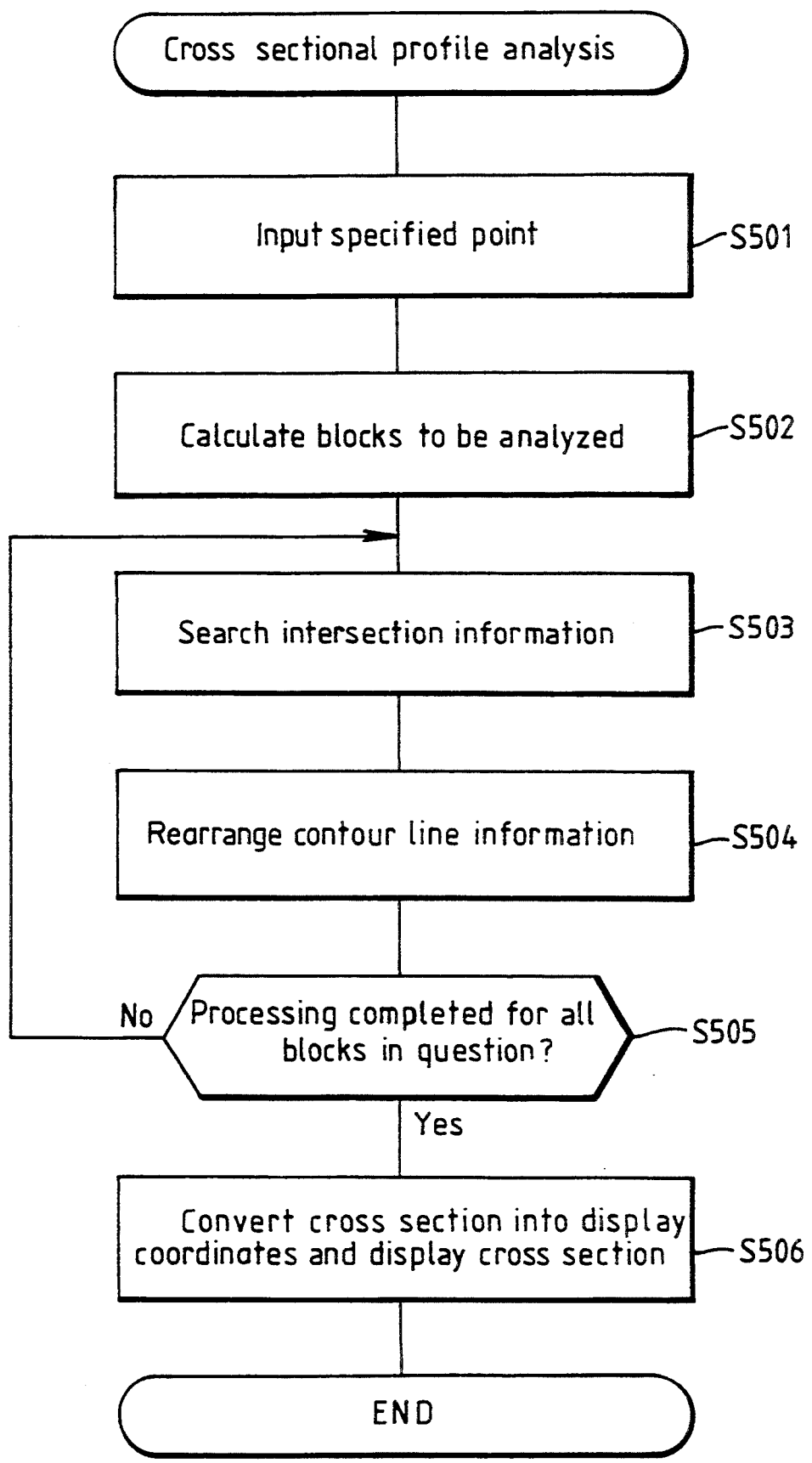

B....Block

Intersection data string | Intersection point number 6 | Distance $\ell_{P_1}$ from point S | Intersection coordinates $(X_{P_1}, Y_{P_1})$ | Altitude 240 m Distance $\ell_{P_6}$ from point S | Intersection coordinates $(X_{P_6}, Y_{P_6})$ | Altitude 200 m

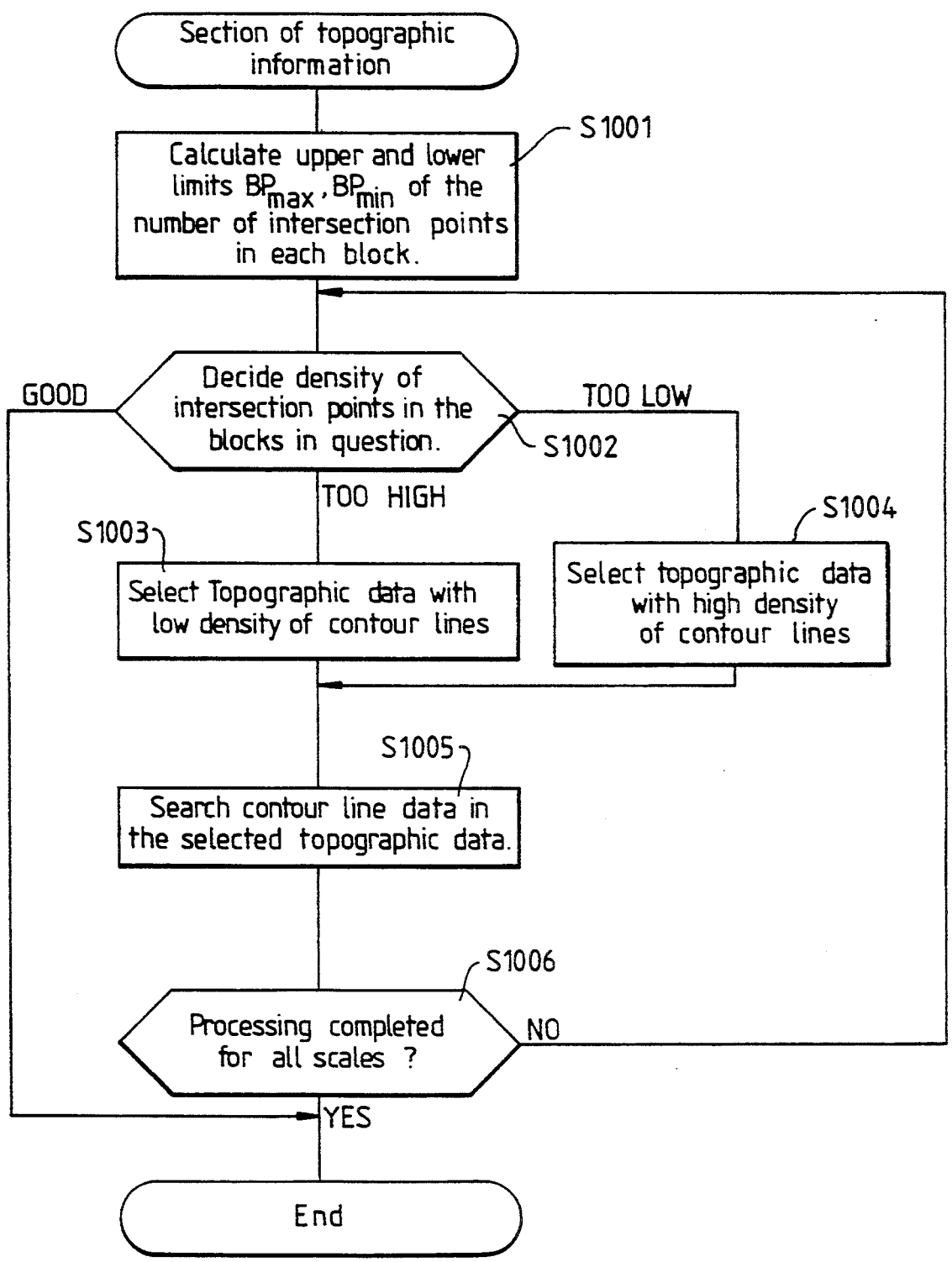

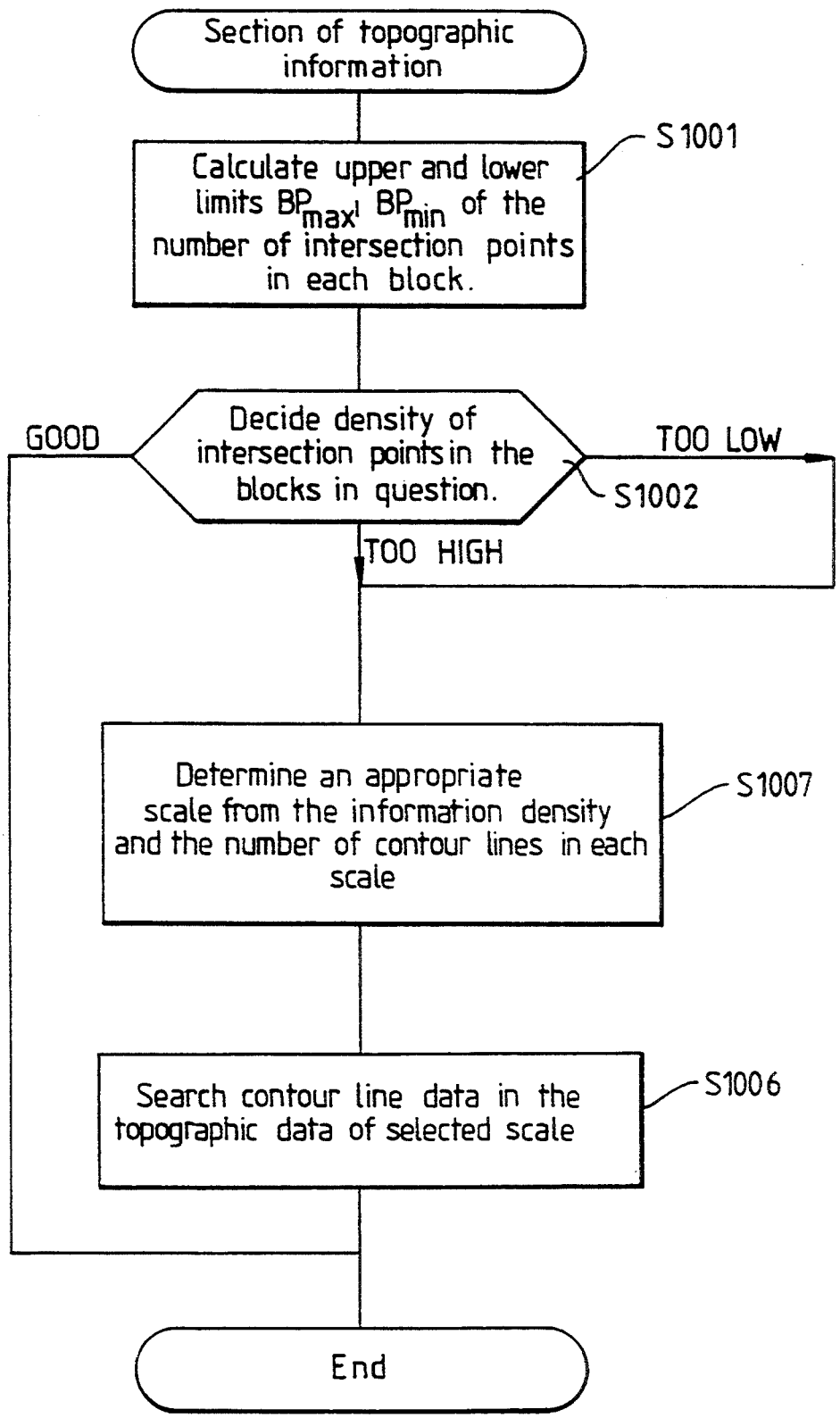

| Blocks to be analyzed | Analyzing distance in block | BP min ~ BP max | Number of intersection points in block | Result of check |
|---|---|---|---|---|
| B7 | ℓ1  2.8 | 3-8 points | 4 points | Within allowable range |
| B4 | ℓ2  1.0 | 1-3 points | 1 point | Within allowable range |
| B5 | ℓ3  3.0 | 3-9 points | 0 point | Below the range |
| B2 | ℓ4  0.7 | 1-2 points | 1 point | Within allowable range |

| Number of intersection points in block | Result of check |
|---|---|
| — | — |
| — | — |
| 4 points | Within allowable range |
| — | — |

For block B5, use topographic information with high density of contour lines.

(P max = 23, P min = 8)

*FIG. 11(b)*

FIG.14(a)
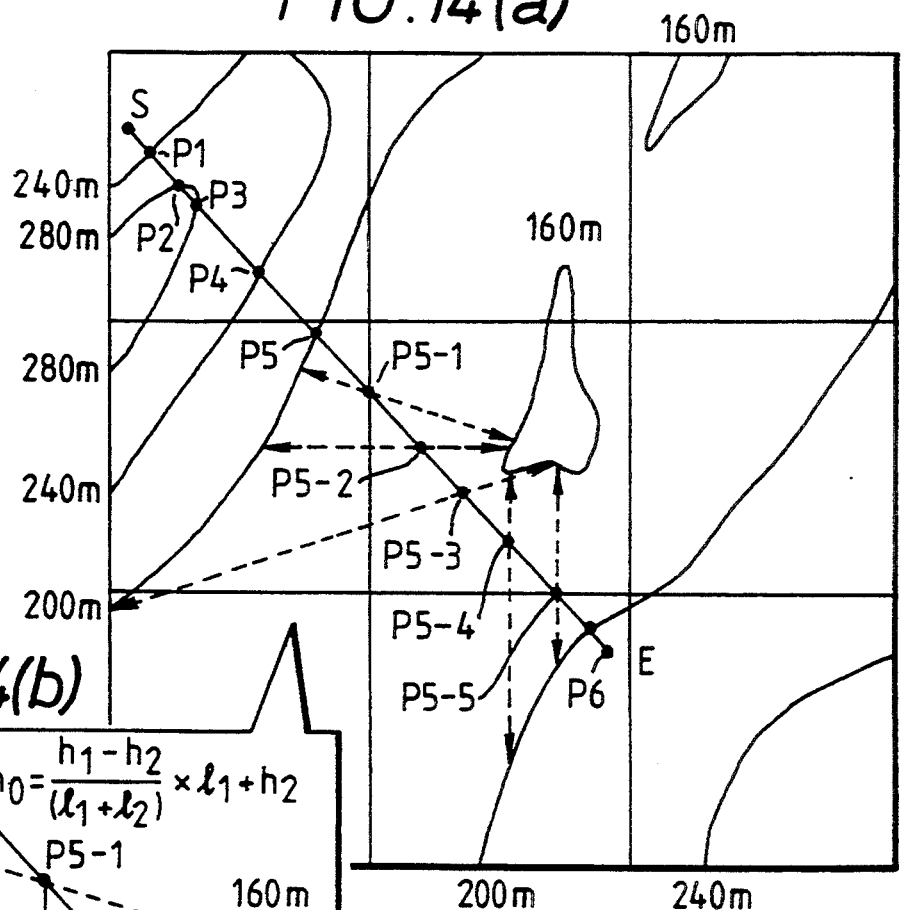
FIG.14(b)
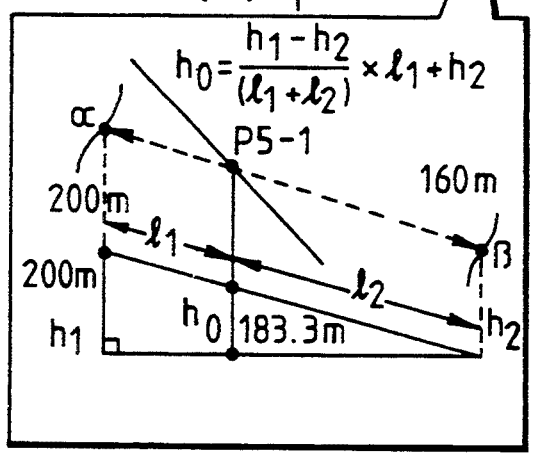
$$h_0 = \frac{h_1 - h_2}{(l_1 + l_2)} \times l_1 + h_2$$
FIG.14(c)
| | | |
|---|---|---|
| P5-1 | Altitude | 183.3 m |
| P5-2 | | 173.3 m |
| P5-3 | | 168.0 m |
| P5-4 | | 169.0 m |
| P5-5 | | 183.6 m |
Interpolated value
FIG.14(d)
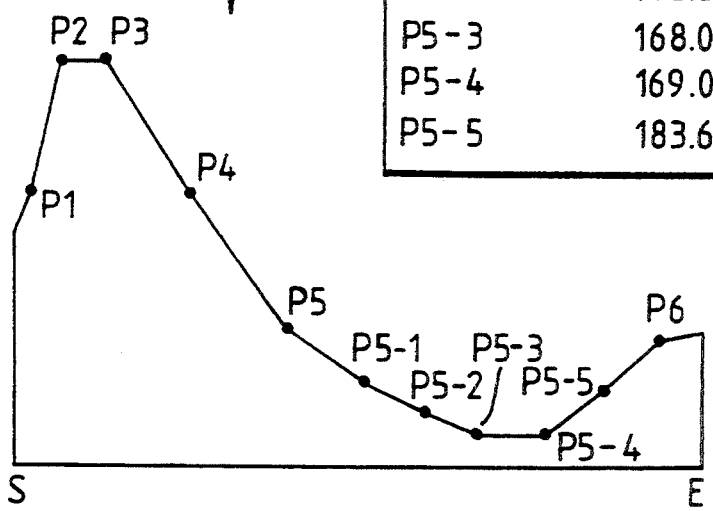

Road

Contour line

Building (artificial object)

(Urban area map)

- ● Intersection point seen from point S
- ○ Intersection point not seen from point S

APPARATUS AND METHOD FOR TOPOGRAPHIC PROCESSING

BACKGROUND OF THE INVENTION

1. Field of the Invention

The present invention relates to an apparatus and method for topographic processing. In topographic processing, map data of one or more maps is analyzed to derive a suitable result, such as a display therefrom. For example, a relief map of a geographical area, formed from map data including contour data, may be displayed.

2. Summary of the Prior Art

It is known to store data representing a map in a computer, and then generate a display of that map. In general, the map data is stored as point data and the operation of generating the display of the map includes joining the point data by lines. However, for the sake of convenience of discussion, those lines will be considered as included within the map data itself.

If the computer memory is sufficiently large, it can store maps representing the same area or region at different scales. In that case, a map of larger scale will display more than a map of smaller scale. Thus, for example, a map of small scale may show only major roads, rivers, and other geographical objects, while a map of larger scale may show minor roads, streams, and a wider range of geographical items. If this were not done, and the small scale map made use of, and displayed, the same data as the large scale map, then either the small scale map would be excessively cluttered with objects, or the large scale map would not give an accurate representation of the region displayed.

It is also known for the user to select the map to be displayed in dependence on the information needed by the user. An example of this is shown in JP-A-63-98780. In that disclosure, the user selected a magnification from a reference scale, and the system then selected a map whose scale was closest to that determined by the magnification, and displayed that selected map. In JP-A-63-98780, there was no processing of the map data, except to display it.

Since such a system contained map data representing maps of different scales, it is also possible to simultaneously display parts of a region at one scale, and other parts at another scale. An example of this is shown in JP-A-2-61690, which was concerned with a display system for a vehicle. In JP-A-2-61690, the region immediately adjacent the vehicle was displayed at a large scale, and more distant regions displayed at a small scale. There was also an intermediate region between the two scales of lines formed by joining points on the edges of the two regions. Again, however, the system only displayed a map, although a composite one.

An alternative proposal, in JP-A-61-267778 was to have two maps of the same scale displaying different data, with one map being based on more data and thereby showing more geographical items. Then, for vehicle navigation, the area immediately adjacent the vehicle was displayed using the map with more geographical items, and regions further from the vehicle were displayed using the map with less geographical items, to give a clear. Again, only map data was displayed.

SUMMARY OF THE PRESENT INVENTION

The present invention seeks to analyze map data and to generate information other than the map data itself. At its most general, and in a first aspect, the present invention proposes that a first map is analyzed to obtain information which is not map data, and where the analysis is unsatisfactory, reference is made to map data of another map, of the same region, in order to improve the analysis.

Thus, suppose that contour information (i.e. a cross-section) is needed for a geographical region. A map of that region may be displayed, with that map being of a small scale so that the map is not cluttered. However, since the map is of small scale, the amount of contour information will be relatively small. Therefore, if a cross-section is analyzed using only the contours displayed, it is likely to be misleading. Therefore, the present invention discloses that use is made of another map, preferably a map of larger scale, to derive a more accurate cross-section.

However, a problem may then arise because the amount of processing needed to analyze the map data for the cross-section based on contour data from the map of larger scale may be excessive. Therefore, the present invention permits use to be made of contour data of a map of small scale, where that contour data gives a reasonable result, and to make use of the contour data of the map of larger scale only where the result from the first map is misleading. This can be achieved by comparing the amount of map data with a threshold.

With the present invention, it is important to understand the difference between the map data and the information obtained by analysis from that data. A map is a two-dimensional representation of an area. Normally, the term "map" is used to indicate a representation of a geographical area but, in the present specification, the term "map" is also used to cover other two-dimensional representations of areas (regions) such as floor plans or charts, which are directly equivalent to geographical maps, but on a much smaller scale. As was previously mentioned, when computers are used to generate such maps, they make use of map data in the form of points, which are then joined by lines for display. The process of displaying such a map, from the map data, is conventional.

The present invention, however, is concerned with analysis of the map data, to derive information which is not, in itself, map data. Thus, analysis involves the consideration of the map data according to a predetermined function in order to generate information which is not, in itself, stored in the computer. For example, where the map data includes contour information, the computer will not store all possible cross-sections. Instead, when the user selects a given cross-section, the computer will calculate the shape of that cross-section on the basis of the contour data. Such processing is referred to herein as analysis. Of course, the present invention is not limited to analysis of contour data to derive cross-sections and is applicable to many other forms of analysis. For example, the present invention may be applied to analysis of whether a viewing line is clear or obstructed.

When the user selects a part of one map for analysis, it is preferable for the system to divide that part into a plurality of sub-regions, and to investigate each region sequentially. In this way, the system can determine whether each sub-region of the selected part meets a predetermined criterion, such as having map data density of a predetermined maximum and/or minimum threshold, and to make use of data of a map of another scale, for the corresponding region, when the threshold is not met. In this way, the processing time may be reduced. Indeed, this use of a threshold for determining whether analysis is carried out on a first or second map represents a second aspect of the present invention.

Thus, returning to the example of contour processing, the user identifies a part of the first map, which may represent a line along which the cross-section is to be determined. Then, if the map is divided into blocks, the line can be divided into sub-regions corresponding to the parts of the line in the respective blocks. For a given map, if the number of intersections of the line with contours is small, or zero, for a given block, there is a risk that the cross-section thus generated will be misleading (since it may show the cross section as flat when it is not). Therefore, the setting of a minimum number of contour intersections per unit line length will enable the system to determine those blocks for which the cross section is likely to be misleading. Then, for those blocks, processing can be shifted to the corresponding block of a map of larger scale, so that more detailed cross-sectional information can be added. The resulting cross-sectional display may then be a composite of the information derived from the map information of the displayed map, for those blocks which meet the threshold, and the map information of a map of larger scale for those blocks which do not meet the threshold.

This invention can be applied further by setting a maximum number of intersections per unit line length. If there are a large number of intersections, the amount of processing needed to derive the cross-section will be large. To reduce the processing of a block of a map in which the number of intersections exceeds the maximum a corresponding map of a smaller scale can be substituted. In this way, the amount of processing may be reduced without the cross section becoming misleading.

Thus, in both these cases, a display is generated of contour information, (i.e. information which is not map data), which has been derived from maps of different scales. This then represents a third aspect of the present invention.

In a further development, in order to improve the accuracy of processing, use may be made of interpolation data. Suppose the user selects a part of a map for investigation. That part may then be divided into sub-regions, and the data corresponding to each sub-region investigated and compared with a threshold. If the threshold is not met, additional data may be derived by interpolation. The use of such interpolation data therefore represents a fourth aspect of the present invention.

It may be seen, from the above discussion, that the display generatable by the present invention has a fundamental difference from displays generated by the known systems, referred to previously, in that the present invention displays information, (ie. something derived from map data by processing which is not, in itself, map data), and for which the display information may be derived from a map of different scale from that currently selected. This represents another aspect of the present invention.

While the above discussion concentrates primarily on maps which are geographical maps, and in particular considers obtaining contour data, the present invention is not limited to the processing of contour data and may for example, obtain information relating to lines of sight, and may also relate to maps which are not geographical, but which relate to building-lay-out. The present invention may be applied to traffic route analysis by making use of a display for depicting the route for a vehicle, the generation of which route display makes use of information of a map other than that displayed.

With the present invention, processing a map data to generate information may be rapid and without degrading the quality of the information displayed. The present invention permits the system to automatically select the map data, scale or type which is most appropriate to the information needed.

BRIEF DESCRIPTION OF THE DRAWINGS

Embodiments of the present invention will now be described in detail by way of example, with reference to the accompanying drawings in which:

FIG. 1 is a functional block diagram of an apparatus for topographic processing being a first embodiment of the present invention;

FIG. 5 is a flow-chart showing steps in cross-sectional profile analysis which may be carried out by the embodiment of FIG. 1;

FIGS. 10(a) and 10(b) are flow-chart showing the selection of map data according to an embodiment of the present invention;

FIGS. 11(a) and 11(b) illustrate the method of checking whether the contour line data satisfies a predetermined threshold;

FIGS. 14(a) to 14(d) illustrate a further embodiment of the present invention, in which use is made of interpolation data;

DETAILED DESCRIPTION

Figure 2A:
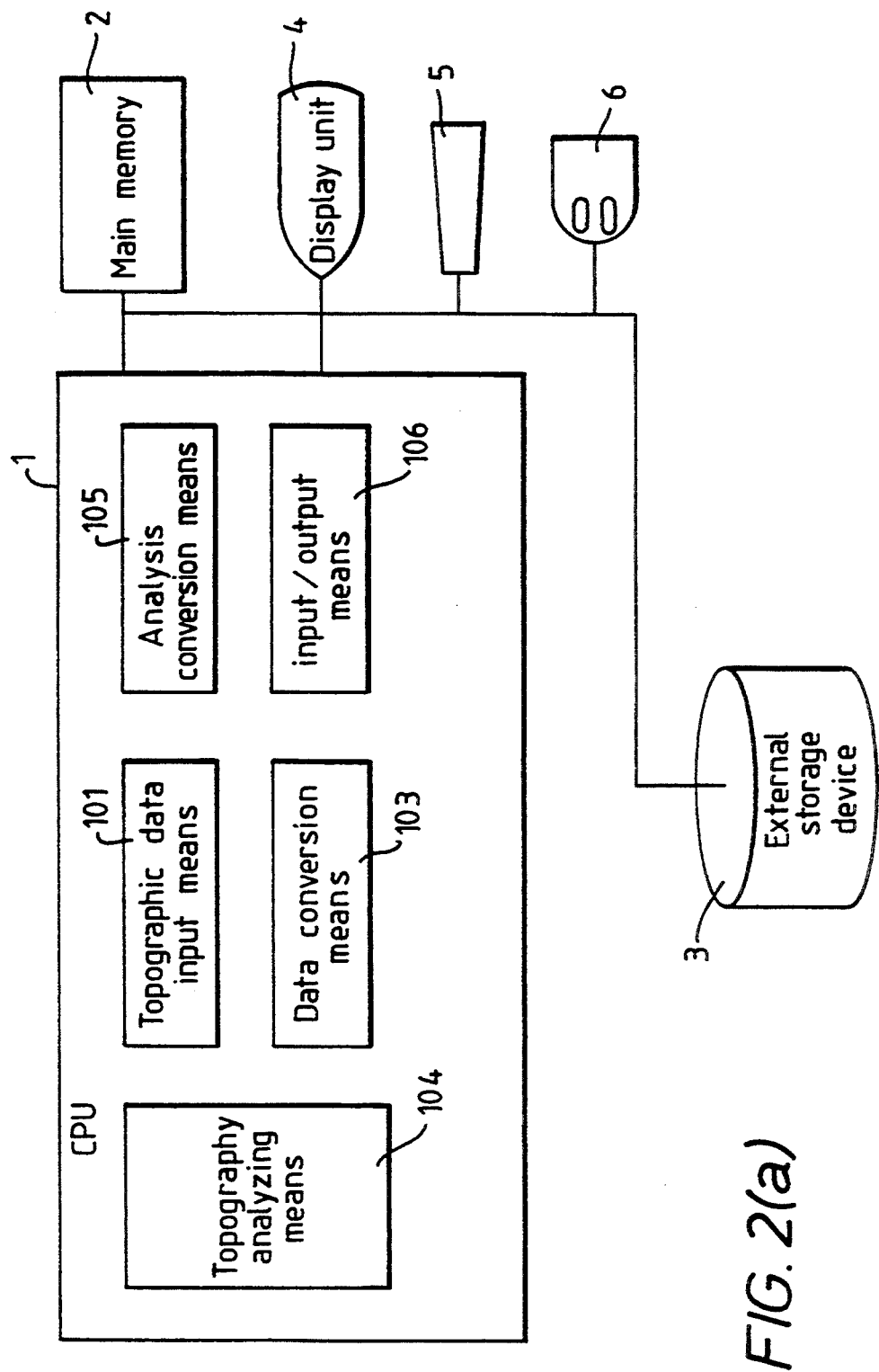
FIGS. 2 (a) and 2 (b) illustrate the physical structure of a system in which the apparatus of FIG. 1 may be embodied.

FIG. 1 shows a first embodiment of a topographic processing apparatus 100 according to this invention. This apparatus 100 comprises: an input/output means 106 for specifying the processing to be performed and displaying the result of processing; a topographic (map) data input means 101 that takes in topographic data (map data) corresponding to a part of a geographical region at a scale specified by the input/output means 106 from an external storage device (not shown) that stores topographic data representing different scales for the region; a memory means 102 for storing the input topographic information to be processed; a data conversion means 103 that converts the stored topographic data to a format that conforms to the requirements of a display function of the input/output means; a topography analyzing means 104 which, according to the instructions given by the input/output means 106, analyzes the topographic information to be processed; and an analysis conversion means 105 that edits the analysis result and converts it into a format that conforms to the requirements for the desired display.

The topography analyzing means 104 has a cross-sectional profile analyzing means 111, a viewing field analyzing means 121 and other processing programs, each with a dedicated function. The cross-sectional profile analyzing means 111 has various functions including: an analyzing block selection means 112; an analysis selection means 113 that determines the appropriateness of the amount of data (density) of the block of the region being considered in the displayed topographic information (such as contour line information) and which, when the density is not suitable, selects topographic information having a different scale; a cross-sectional information calculation means 114; and an editing means 115 for editing the result of the analysis. The information used in selective processing by the topography analyzing means 104 is received by the topographic data input means 101 and stored in the memory means 102 on the basis of a request from the topography analyzing means 104. The data conversion means 103 may also be capable of displaying the information selected by the analysis selection means 113 instead of the currently displayed information.

Since the topographic processing apparatus of this embodiment has the configuration described above, it can perform a variety of processes according to the desired information, such as displaying topographic maps according to the specifications given by an operator (region, scale, information category, etc.), and making a cross-sectional profile analysis based on the data of the displayed topographic map.

The topographic processing apparatus of this embodiment may be realized, for example, by a computer system shown in FIG. 2(a). This system consists of a central processing unit 1, a main memory 2, a disk storage device 3, a keyboard 5, a mouse 6, and a visual display unit 4.

Figure 2B:
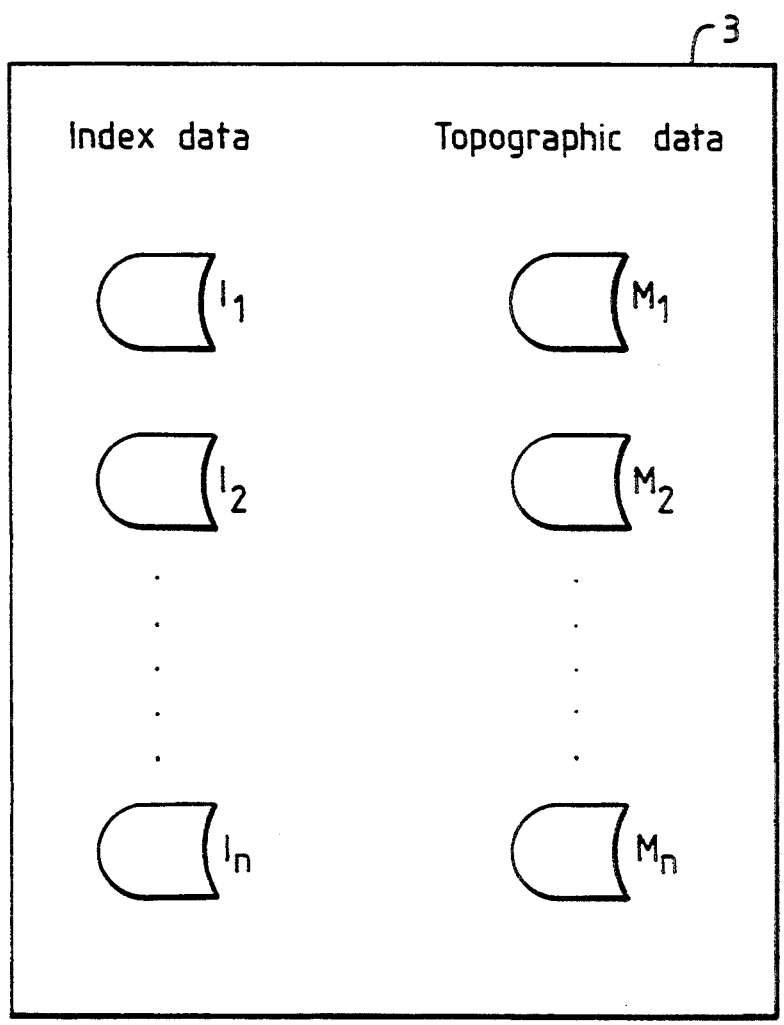

The main memory 2 stores an operation program for the central processing unit 1 and also the topographic data to be processed. The central processing unit 1 executes the program stored in the main memory 2 to achieve the various functions of the topographic processing apparatus of this embodiment. For example, it carries out the functions of the data conversion means 103, the topography analyzing means 104 and the analysis result means 105. The disk storage device 3 works as an external storage device and, as shown in FIG. 2(b), stores a large amount of topographic data arranged according to a plurality of scales ($M_1$–$M_n$) as well as index data ($I_1$–$I_n$). As described later, the topographic data includes various kinds of geographical features such as contour lines, rivers, roads and buildings, all linked or related to each other. The keyboard 5, mouse 6 and display unit 4 are part of the input/output means 106 and with the central processing unit 1 carry out the function of data input in the topographic data input means 101 and the function of controlling the input/output of data.

Figure 3A:
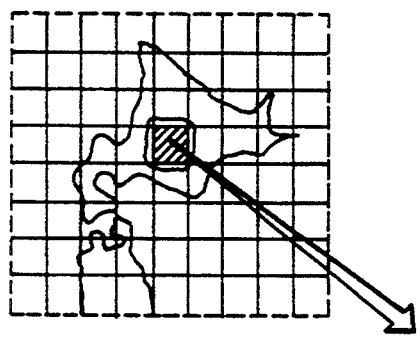
FIGS. 3 (a), 3 (b) and 3 (c) illustrate the basic structure of map data which may be used in the present invention.
Figure 3B:
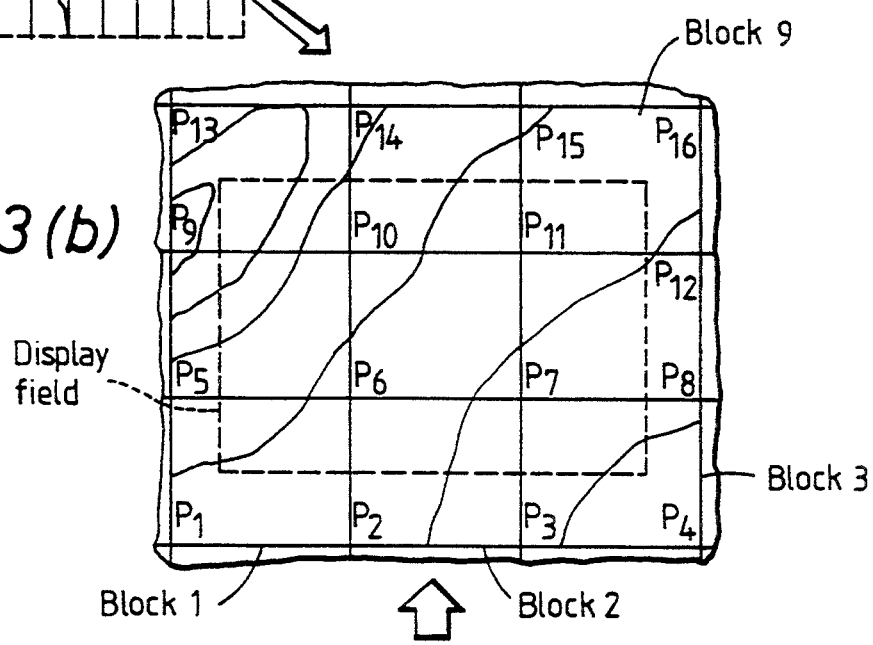
Figure 3C:
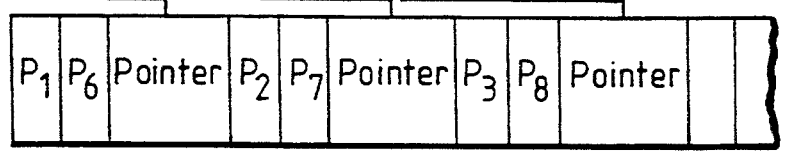

Referring now to FIGS. 3(a) to 3(c), the use of the topographic data in this embodiment will be discussed. The shaded region on a map of FIG. 3(a) is divided into nine blocks of equal areas as shown in FIG. 3(b) and stored in the memory. As shown in FIG. 3(c), the topographic data M of each block is paired with index data I, which is used for identifying the topographic data. The topographic data M consists of a plurality of topographic data $M_1$–$M_n$ for different scales (for example, 1/25,000, 1/50,000, etc.) and each topographic data has corresponding index data $I_1$–$I_n$.

Each topographic data $M_i$ corresponding to a particular scale is divided into unit areas (block 1-L), which are common for all scales. The index data $I_i$ consists of position data identifying the lower left and upper right corners of each block (in the case of block 1, lower left corner $P_1$ and upper right corner $P_6$) and a pointer indicating the storage address of the block of topographic data. For a specified scale and region, a search is made of the corresponding index data to find the topographic data of the blocks specified and spread the retrieved topographic data in the main memory 2. The topographic data is then converted for display on the display unit 4 by the data conversion means 103.

As is normal for maps, maps of different scales have different densities of topographic data for a given geographical area (region). If the map is of a large scale, only coarse data can be displayed, or the map will become too complicated to read. Therefore, although the topographic processing apparatus of this embodiment may store highly detailed topographic data in the disk storage device 3, the topographic data is not displayed for all maps. Instead, only some of the topographic data is displayed for a map of small scale, so that the display thereof does not become cluttered. Therefore, the user may select an appropriate map scale, by use of the keyboard 5 and/or mouse 6, and only the topographic data appropriate to that scale will be converted by the data conversion means 103 and displayed.

Furthermore, since the blocks (unit areas) are common to all scales, there is immediate linking of the topographic data required for display of each scale. It is therefore readily possible to relate topographic data used to generate a map of one scale to the data of the corresponding map at another scale, by considering the data content of the unit areas (blocks).

It should further be noted that the term "topographic data" refers to the data stored in the appropriate memory, and that data needs to be converted by the data conversion means 103 in order to generate a display.

Figure 4A:
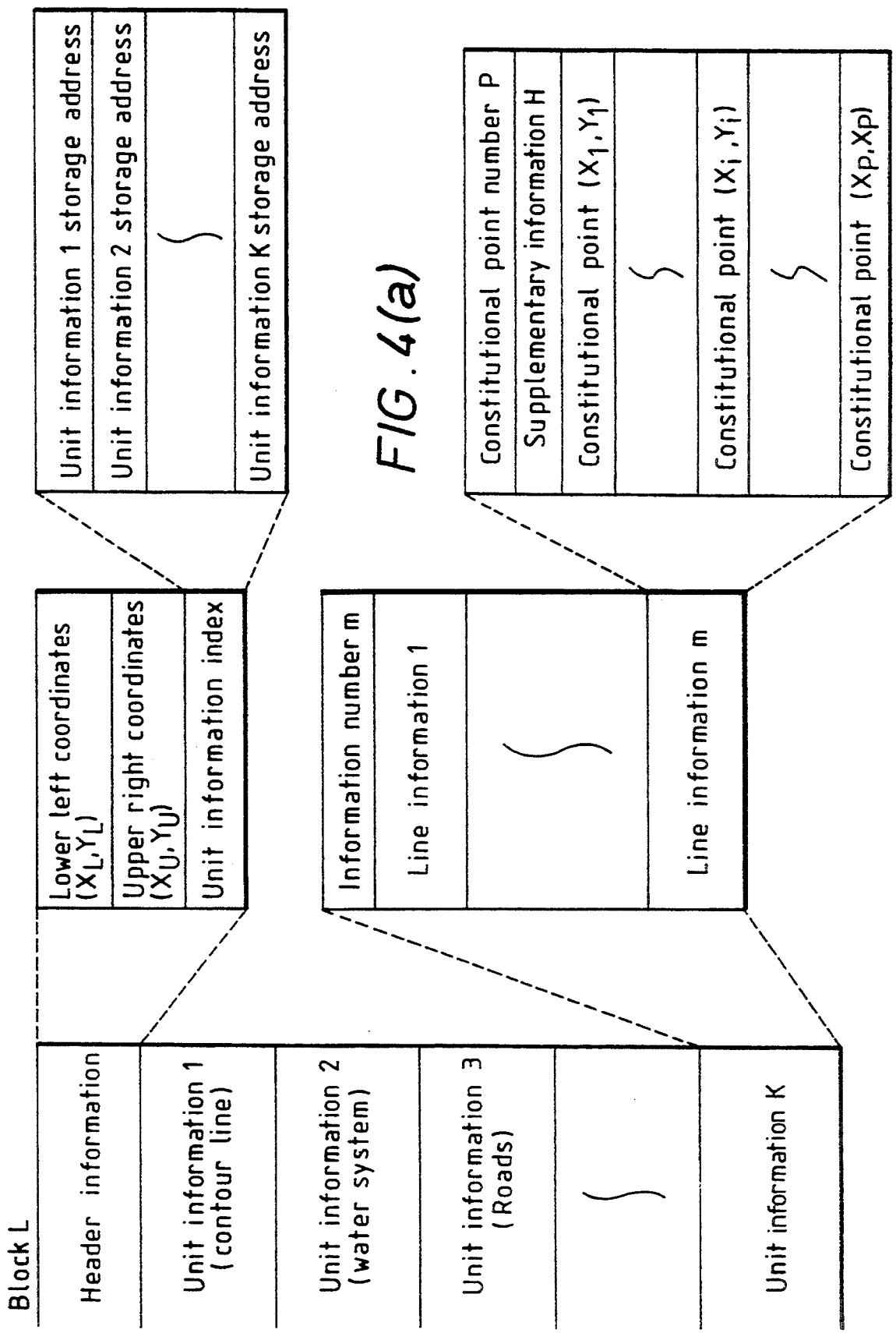
FIGS. 4 (a) and 4 (b) illustrate the hierarchal configuration of map data for blocks of the map shown in FIG. 3, including contour line data of the map data.

FIGS. 4(a) and 4(b) show the configuration of the topographic data corresponding to one block. The topographic data of each block comprises, as shown in FIG. 4(a), of header information and a plurality of unit information, each containing different information relating to ground surface features (such as contour lines, water systems, roads, etc.). The header information consists of coordinates of the lower left corner $(X_l, Y_l)$ and upper right corner $(X_u, Y_u)$ and unit information index representing the storage addresses of the unit data 1-k. Each unit data may contain, for example contour line data which includes the information number m (equal to that of the contour lines) and line information 1 to m, where each line information comprises a number of data points P, ancillary information H (in the case of a contour line, the altitude thereof) and the data points themselves. When the points are connected by lines on the display unit 4, a contour map as shown in FIG. 4(b) is obtained.

Thus, in practice, the topographic data includes data representing points on the map, and those points have to be converted to lines or other shapes before the map can be displayed. Such processing is concerned with "map data" (ie. that which is used to generate a two-dimensional representation of a geographical or similar area) and the term "map data" in the present specification includes the topographical data representing points on the map, and the data needed to generate lines to join such points.

Next, one example of a topographic data processing method using the above topographic data will be described, referring to the geographical cross-sectional analysis.

When instructed by the keyboard 5 to display a cross-sectional profile, the topography analyzing means 104 starts a ground profile analyzing routine as shown in FIG. 5.

Figure 6A:
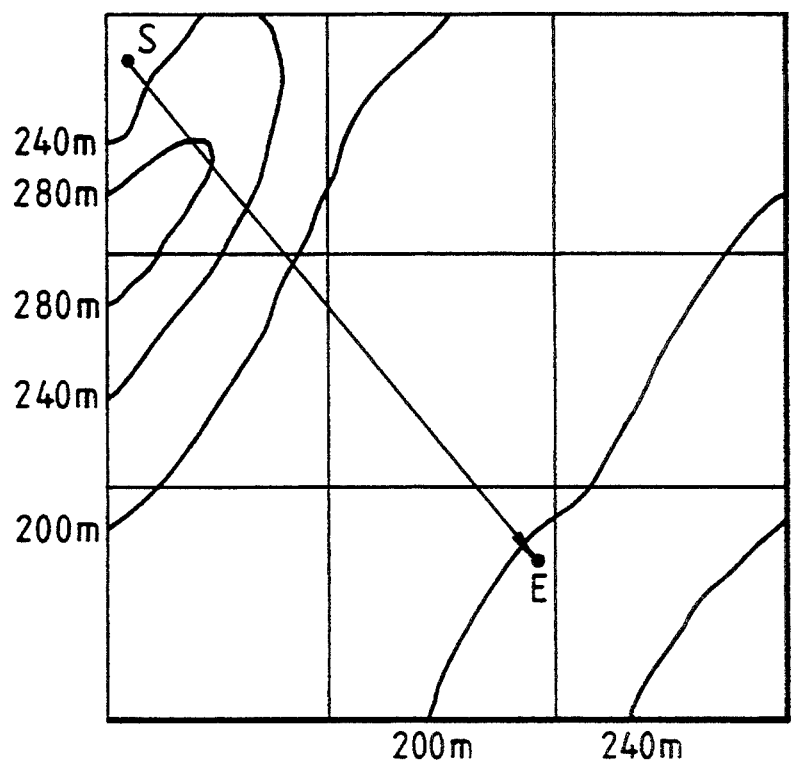
FIGS. 6 (a) and 6 (b) are map diagrams illustrating the procedure for determining blocks of the map to be analyzed in an embodiment of the present invention.

Referring to FIG. 6 and steps in FIG. 5, a map of a suitable scale (1/100,000 for example) is depicted on the display unit 4, and coordinates of point S and E representing the section where the ground cross-sectional profile is to be analyzed are selected via the mouse 6, as shown in FIG. 6(a) (step 501). From the coordinates entered, the analyzing block selection means 112 determines the blocks $B_j$ (j=1, 2, ..., BSU) within which the section from point S to point E is included, (step 502).

Figure 6B:
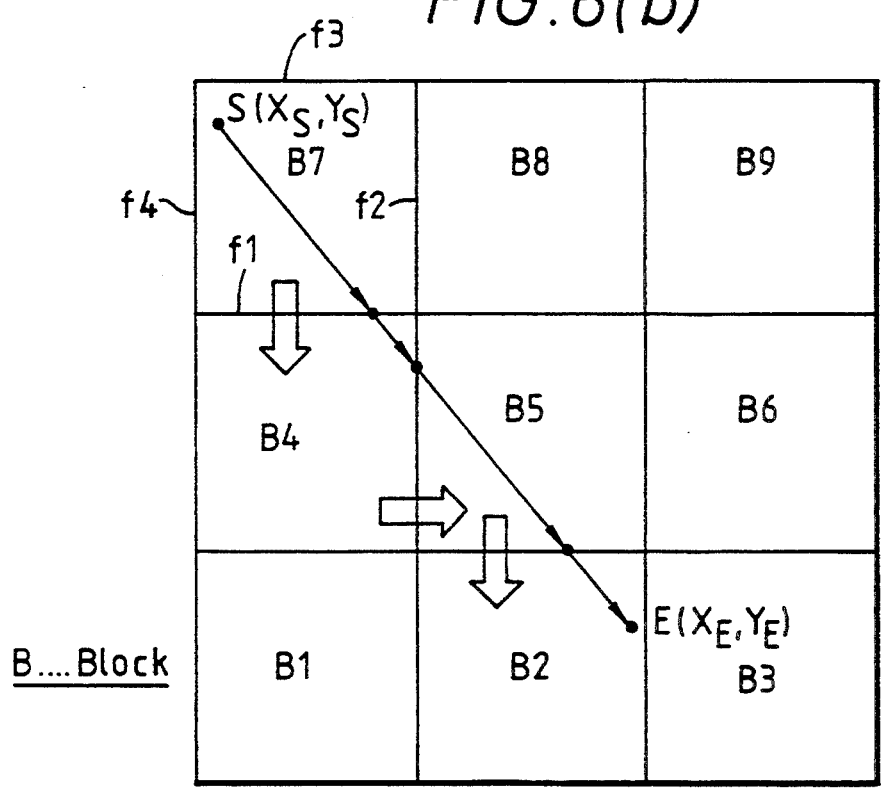

FIG. 6(b) shows the method of determining the blocks to be analyzed. First, blocks $B_7$ and $B_2$ are selected which include the point S and the point E. The decision on the block $B_7$ is made by checking if the coordinates of the point S $(X_s, Y_s)$ is within a range of the coordinates of the lower left corner $(X_L, Y_L)$ and the upper right corner $(X_u, Y_u)$, this range representing the size of each block. A similar check is made of the block $B_2$ containing the point E. Next, a line segment connecting the points S and E is analyzed to determine if it intersects four boundary lines $f_1$–$f_4$ of the block $B_7$ which contains point S. It is thus possible to calculate the direction from point S toward point E and identify the boundary lines that the line segment crosses to $f_1$ and $f_2$ only. In the case shown, since the line segment SE connecting the points S and E intersects the boundary line $f_1$ of the block $B_4$, it can be determined that the block $B_4$ needs to be analyzed. This process is repeated beginning with the block $B_7$ containing the point S and ending with the block $B_2$ contains the point E. This identifies the blocks to be analyzed as being blocks $B_7$, $B_4$, $B_5$ and $B_2$.

Figures 7A, 7B:
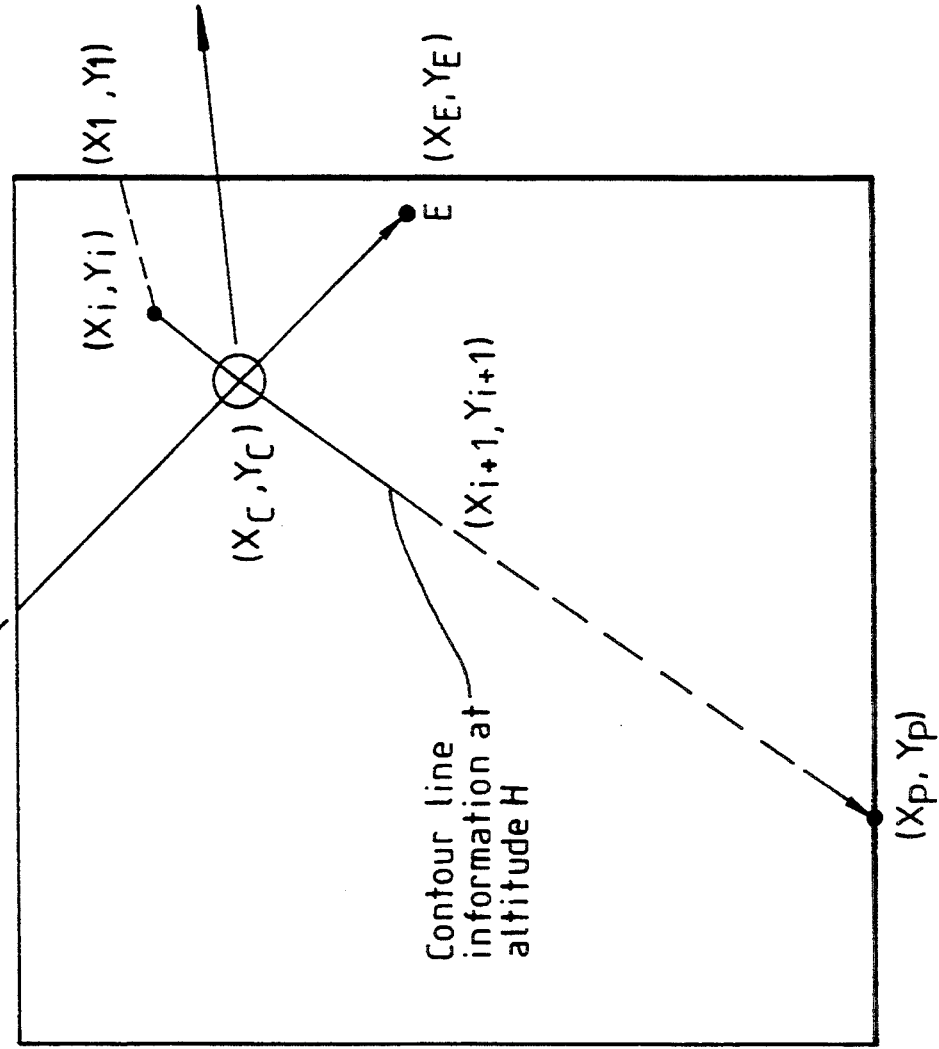
FIGS. 7(a) and 7(b) illustrate the analysis used to obtain contour line intersections.

Next, for each block that has been identified as requiring analysis, an investigation is made of the contours crossed by the line segment SE (step 503). FIG. 7(a) shows the process of determining the intersecting points between the contour lines in the block $B_2$ of FIG. 6 and the line segment SE. The contour line at altitude value H in the block $B_2$ is stored in memory as a collection of data points $(X_1, Y_1), \ldots, (X_P, Y_P)$ that represent the position information of the contour line. A check is then made to see if there is an intersection point between each of line segments connecting two adjacent points $(X_i, Y_i)$ and $(X_{i-1}, Y_{i+1})$ (i=1 to p−1) and the segment SE. When, as shown in FIG. 7(a), there is an intersection point $(X_c, Y_c)$, the coordinates of the intersection point, the distance 1 from the point S to the intersection point, and the altitude value H of the contour line intersected are stored in memory as intersection information, as shown in FIG. 7(b). The reason that such a check on intersections is made for all line segments of a single contour line is that there is a possibility that the segment SE crosses the same contour line at two or more points. This processing is carried out for all contour lines in the block $B_2$ and the intersection results obtained are rearranged in order of closeness to the point S (step 504).

Figure 8A:
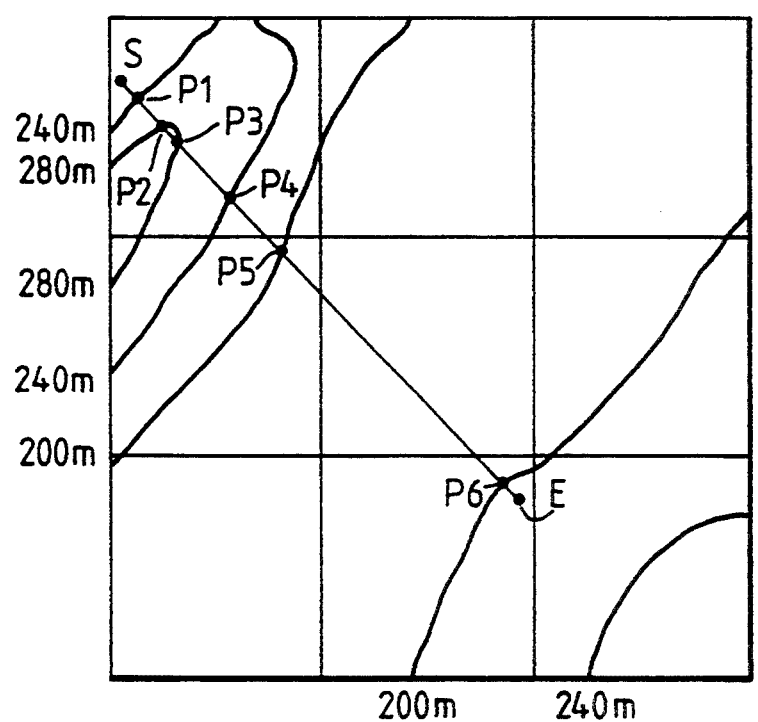
FIGS. 8(a), 8(b) and 8(c) illustrate contour line analysis, with FIG. 8(a) illustrating a map for which a cross-section is to be derived, FIG. 8(b) showing the data used, and FIG. 8(c) showing the cross-section derived.
Figures 8B, 8C:
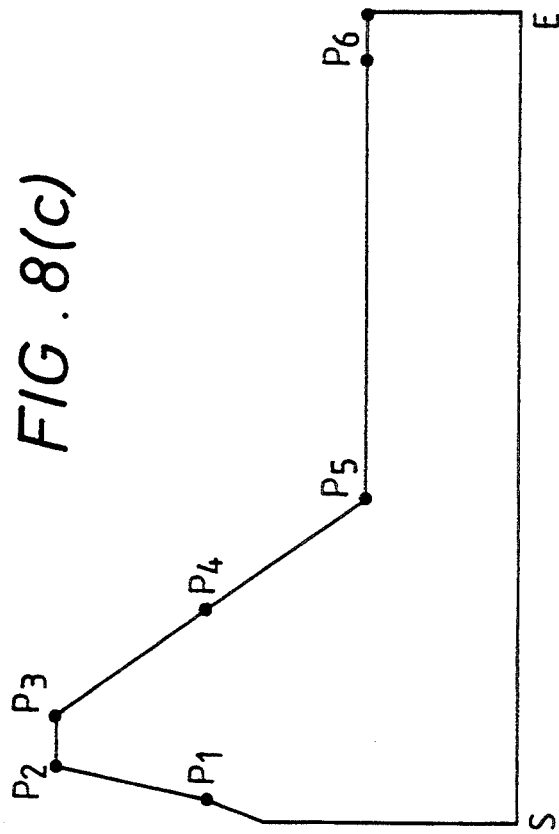

In this way, step 503 and step 504 are performed for all blocks to be analyzed (step 505). The intersection points $P_1$–$P_6$ in FIG. 8(a) are stored in the memory as an intersection string as shown in FIG. 8(b). The conversion means 105 converts the intersection string into cross-sectional profile coordinates and displays the geographical cross section as shown in FIG. 8(c) (step 506).

In the cross section of FIG. 8(c), however, the part between intersection points $P_5$ and $P_6$ is flat, giving no detailed information about the geographical features therein. This occurs because the density of the contour lines used in the cross-sectional analysis is low and there is an insufficient amount of data to derive a suitable number of points of intersection with the contour lines.

Figure 9A:
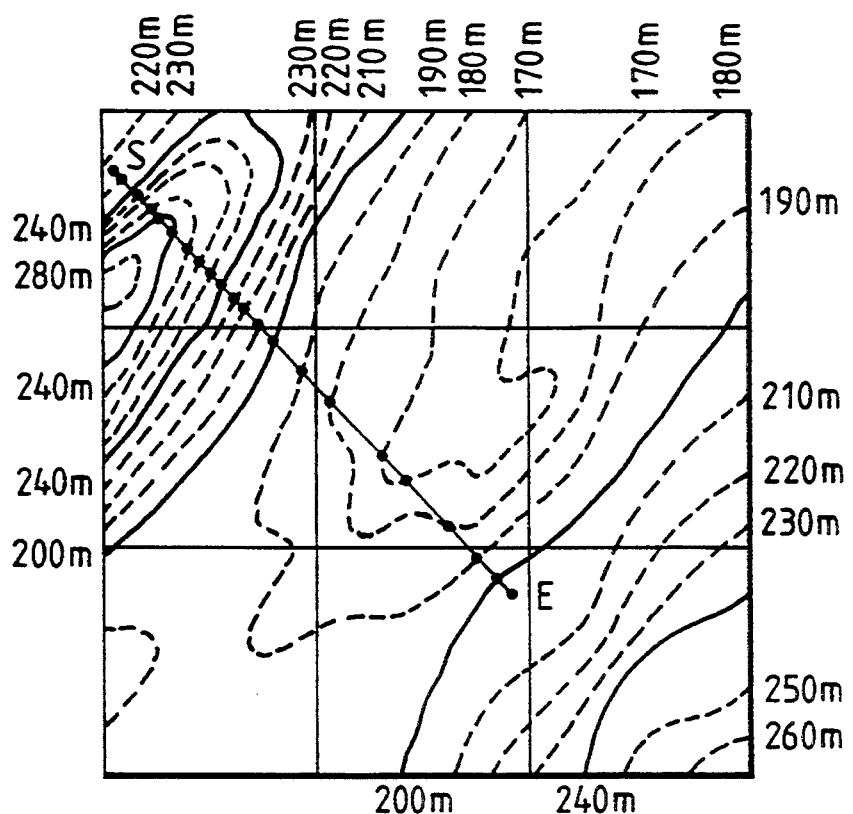
FIGS. 9(a) and 9(b) correspond generally to FIGS. 8(a) and 8(c), but for a map having a higher contour line density.
Figure 9B:
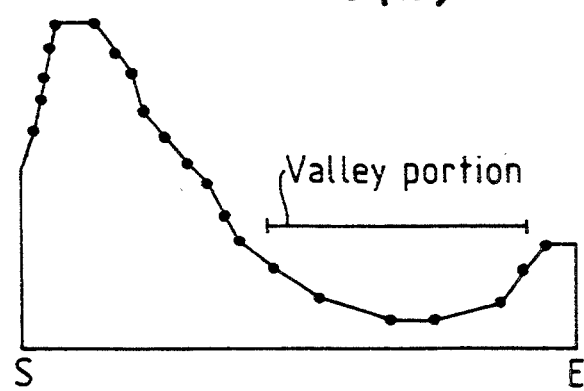

FIGS. 9(a) and 9(b) show another cross section obtained when the topographic data representing a larger number of contour lines is used. In this case, a valley is identified between the intersection points $P_5$ and $P_6$. The result of the ground cross-sectional analysis depends significantly on the amount of topographic information used for the analysis (in this case, the number of contour lines). Thus, to generate the cross-section of FIG. 9(b), a large amount of analysis is necessary because of the large number of intersection points. For the part of the section between points $P_5$ and $P_6$, additional useful information is given, but it can be seen that the part of the cross section between points $P_1$ and $P_5$ in FIG. 8(c) is generally similar to the same region of the cross-section of FIG. 9(b), despite the higher number of intersection points processed in the latter case. Hence, the improvement in cross-section achieved by the use of a map data from a map of larger scale is not always justified by the increase in processing needed.

For this reason, this embodiment makes use of analysis selection means 113, which prior to the step 504 of FIG. 5 checks for the adequacy of the amount of data for the area to be analyzed and, when the amount is not sufficient, selects topographic data suited for the analysis.

Figure 11A:
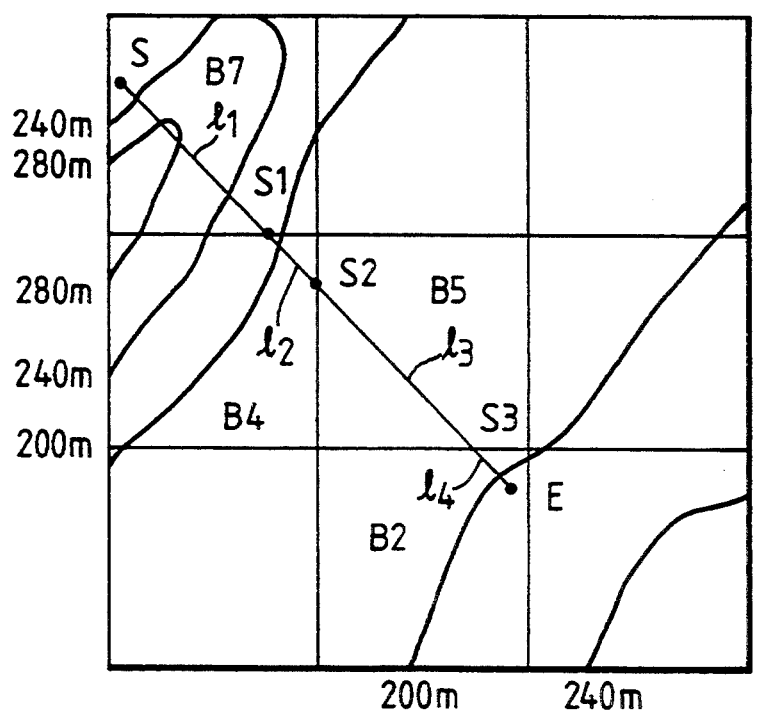

FIGS. 10(a) and 10(b) show flow-charts of the process for selecting appropriate topographic data for geographical cross-sectional analysis. Referring to FIG. 10(a), first for each block being analyzed, upper and lower limits $BP_{max}$, $BP_{min}$ of the number of intersection points with contour lines required to express the cross-sectional profile (step 1001) are determined. To achieve this, the upper limit $P_{max}$ and lower limit $P_{min}$ of the total number of intersection points in the region being considered are pre-set. Next, individual distances $l_1$ (S–S$_1$), $l_2$ (S$_1$–S$_2$), $l_3$ (S$_2$–S$_3$), $l_4$ (S$_3$–E), which constitute the overall distance l of the line segment SE connecting points S and E, are determined (FIG. 11(a)). Thus, the line is divided into sub-regions corresponding to individual distances $l_1$ to $l_4$. Then the upper limit $BP_{max}$ and lower limit $BP_{min}$ of the number of intersection points in each block are calculated from the ratio of each distance $l_1$, $l_2$, $l_3$, $l_4$ in each block to the overall distance l of the line segment SE. In this example, as shown in FIG. 11(b), $l_1=2.8$, $l_2=1.0$, $l_3=3.0$, $l_4=0.7$, and if $P_{min}$ and $P_{max}$ are set to 8 and 23 respectively, then $BP_{min}$ and $BP_{max}$ of the block B$_5$ will be 3 and 9, respectively.

Then, a check is made to see if the number of intersection points in each block calculated at step 503 falls between the limits $BP_{max}$ and $BP_{min}$ to determine the adequacy of the contour line distribution density in the block (step 1002). When the result is good (the number of intersection points is within the limits), the process moves to step 504 of FIG. 5.

When the number of intersection points in the block is larger than $BP_{max}$, a map whose scale is one step smaller (contour line distribution density is lower) than the currently selected (or displayed) scale for the block is selected (step 1003). When the number is smaller than $BP_{min}$, a map whose scale is one step larger (contour line distribution density is higher) than the currently selected (or displayed) scale for the block is chosen (step 1004).

Next, using the topographic data of the map which was selected at step 1003 or step 1004, the contour data in the block region corresponding to the first map (which was determined as having an inadequate contour distribution density) is investigated (step 1005). For this purpose, the index information shown in FIG. 2b is investigated to obtain the appropriate topographic data for the corresponding block of the map selected at step 1003 or 1004 and that data is stored in the memory in addition to the data for the map currently displayed. Then, in the same way as the step 503 of FIG. 5, the contour lines derived from the data are analyzed to obtain the intersection points.

Based on the intersection data newly calculated at step 1005, a check is made at step 1002 to determine whether the number of newly obtained intersection points is between $BP_{max}$ and $BP_{min}$. The intersection results are rearranged in the order of closeness to the point S as in the step 504 of FIG. 5 and used for displaying the cross-sectional profile.

The processing of steps 1002–1005 can be performed for maps of all scales available in this apparatus until an appropriate map is chosen (step 1006). In the decision at step 1002, when changing the scale of the map to the next available scale produces a contradictory result such as a shift from too small a density, to too large a density or vice versa, the denser of the two is taken as appropriate and selected.

As shown in FIG. 10(b), instead of selecting a new map one step at a time, it is possible to search the number of contour lines for each scale for the region being processed and, from the initially determined number of contour lines and the scale, directly infer a desirable scale to alleviate the processing load at step 1003 and step 1004. The decision at step 1002 may also be made for only $BP_{min}$ and necessary information added therefore. Rather than making a decision based on the number of intersection points, it is also possible to make a decision on the adequacy of the information amount from the contour information number m in each block immediately after the analyzing block selection (step 502) and then perform the cross-sectional profile analysis.

Figure 12A:
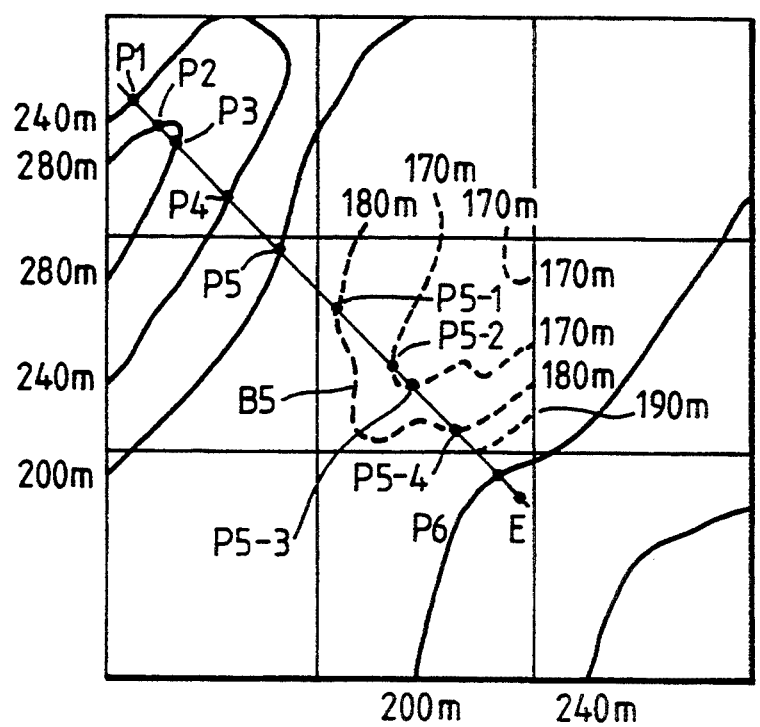
FIGS. 12(a) and 12(b) correspond to FIGS. 9(a) and 9(b) but in which part of the cross-section is derived from a map of one scale and part is derived from a map of another scale.
Figure 12B:
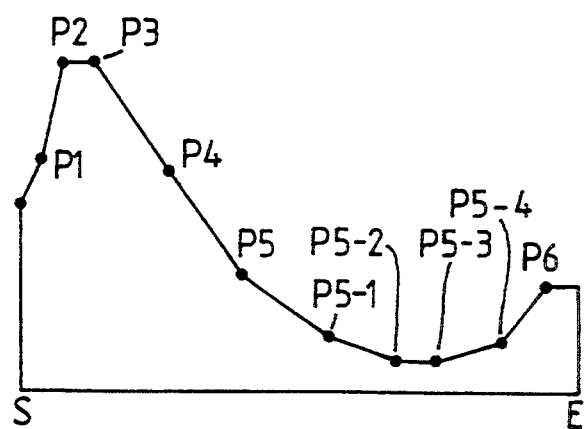

FIGS. 12(a) and 12(b) show the ground cross section displayed after the added processing of FIG. 10 is performed. In FIG. 11(a), the number of intersecting points on the line segment SE in the block B$_5$ is below the lower limit $BP_{min}$ and hence the distribution density of the contour lines is determined to be too low. For the block B$_5$, the display information is left intact and topographic information whose contour line distribution density is higher than in other blocks (for example, a scale of 1/25,000 rather than 1/100,000) is used to add contour lines shown as dashed lines in FIG. 12(a). This increases the number of intersecting points in the region above the $BP_{min}$, displaying the cross section as indicated in FIG. 12(b). In FIG. 12(a) intersection points $P_{5-1}$, $P_{5-2}$, $P_{5-3}$, $P_{5-4}$ are added, so that the part of the cross-section between $P_5$ and $P_6$ of FIG. 8, which appeared as a flat area can now be recognized to be a valley.

It can be noted that although it is possible to display the additional contour lines within block B$_5$, this is not necessary and, indeed, may be undesirable as it may cause confusion. Thus, it is not essential in the present invention that, when the apparatus refers to map data from another map from that displayed, that map data is then used in all or part of the display. Instead, that map data may only be used in order to derive appropriate information, such as the contour cross-section.

As mentioned above, by checking the distribution density of contour lines for each block of the region being analyzed and selecting topographic information of an appropriate scale, the cross-sectional profile of the region can be displayed with high precision.

The relationship between the amount of topographic data and the map scale will now be discussed. The configuration of the maps shown in FIGS. 3(a) to 3(c) is the same throughout the blocks of the same equal scale. However, when the scale differs, the information number m, point number P and the kind of unit data vary from one block to another (for instance, the intervals of contour lines).

Figure 13:
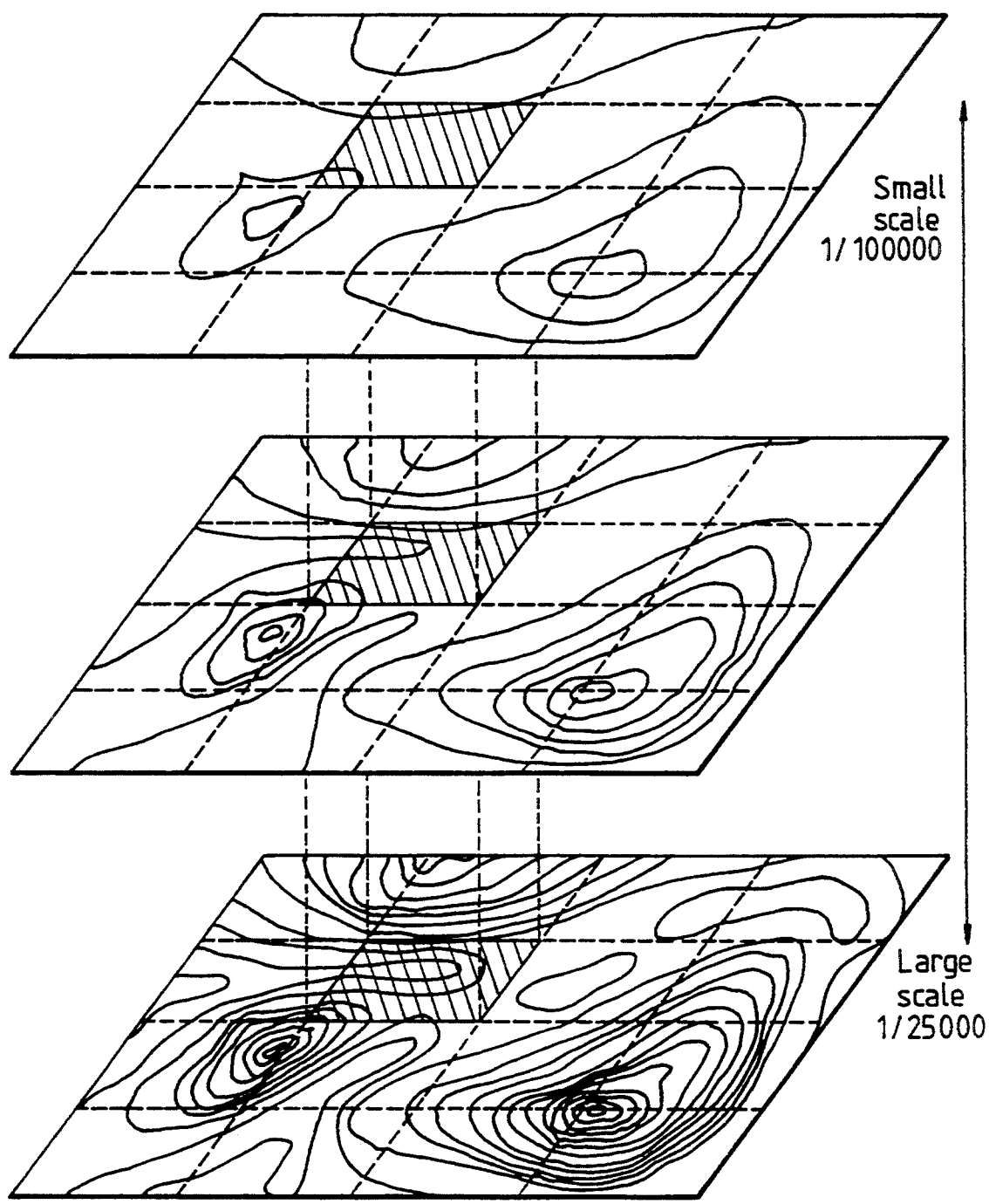
FIG. 13 shows the relationship between map scale and map content.

FIG. 13 shows schematically how the contents of the map change with scale. The amount of topographic data for the same region increases as the scale increases (reduction factor decreases). For instance, as the scale increases, the contour lines are drawn at smaller altitude differences, making them dense. Table 1 shows the relationship between the scale and the contour line interval (altitude difference) in actual map information.

TABLE 1

| Scale | Contour line interval (m) |
| --- | --- |
| 1/25,000 (large) | 10 (high density) |
| 1/50,000 | 20 |
| 1/100,000 | 40 |

TABLE 1-continued

| Scale | Contour line interval (m) |
| --- | --- |
| 1/250,000 | 100 |
| 1/500,000 (small) | 200 (low density) |

River information that is included in a certain scale is determined by a river class assigned according to the width of the river. Road information that is displayed at a certain scale is not determined by the road width. Main roads (national roads and express highways) are included in the road information displayed at a small scale. The road information shown at a large scale also includes other roads in addition to main roads (local roads and village streets).

In the maps used as this embodiment, the blocks, which are the dividing units of a map, are based on a specified area of land. That is, the blocks have the same two-dimensional area irrespective of the scale. Hence, exchange of any block information in the above analysis and display processing can be done at one-to-one correspondence. For example, when, in the display of FIG. 12(a), the analysis of data of block $B_5$ is to be replaced by analysis of a larger scale ($M_i$) whose contour line distribution density is high, this can be achieved by reference to the same unit information of block $B_5$ which has the larger scale ($M_i$).

The above embodiment illustrates the case where the line segment SE from point S to point E which specifies the desired cross-section intersects all the contour lines present in a given block under consideration. There may be, however, a case where (as with the block $B_5$ of FIG. 14(a)) a contour line at an altitude of 160 m does not intersect the line segment SE and no intersection point occurs or the number of intersections is small). As a result, the step 1002 of FIG. 10 will detect that the density of intersection points in the block is too low. In this case, instead of moving to the step 1004 FIG. 10(a), for selecting a map with a larger scale and so with larger number of contour lines, the following interpolation process may be performed to supplement the intersection information as long as the number of contour lines m is one or more.

In FIG. 14(a), a line segment SE passing through block $B_5$ (for which block the line segment SE does not intersect any contour lines) is divided equally to produce a number of intersection points required to make the cross section along the line meaningful (for example, $BP_{min}$). At each of the intersection points thus formed $P_{5-1}$-$P_{5-n}$ (n=5 in FIG.14(a)), the altitude is calculated as follows. A plurality of straight lines are drawn from each point $P_{5-i}$ (i=1 to n) as a center in a plurality of directions at equal angles. As shown in FIG. 14(b), lines are chosen which originate at points $P_{5-i}$ and cross the contour line (160 m) in the block $B_5$ at shortest distances (point $\beta$). When the selected lines are extended on the other side of the line segment SE and intersect the contour line (200 m) in other blocks (point $\alpha$), the difference in altitude between the two intersecting points ($h_1$-$h_2$) and the distances of point $P_{5-i}$ ($l_1$) from the two intersection points ($\alpha,\beta$) are determined. Hence, the altitude ($h_0$) at the point $P_{5-i}$ may be calculated by interpolation, using Equation 1.

$$h_o = \frac{h_1 + h_2}{l_1 + l_2} \times l_1 + h_2 \qquad \text{(Equation 1)}$$

In this way, the altitudes of points $P_{5-1}$-$P_{5-n}$ are successively estimated by interpolation and those points are used as artificial intersection information for the block $B_5$, permitting a highly precise cross-sectional profile to be displayed as shown in FIG. 14(d). The optimization of the amount of information using interpolation, may be performed after the step 1006, rather than before the step 1004, or may be done upon demand by an operator.

In the above embodiment, when the amount of data for the region being analyzed is (at least partially) not uniform, an area with too much or too little information may be supplemented with data, or the amount of data may be equalized with other areas to enable homogeneous and highly precise analysis of the map.

While the above embodiment illustrates the application of the present invention to topographical analysis, this invention can also be applied to the display of other topographic information. That is, according to the distribution of data in the region (area) to be displayed, topographic data of a map of a different scale is selected for areas which have too little or too much information, thereby permitting display of geographical features that cannot be obtained with conventional map information. When, for example, this technique is applied to automobile navigation, road data of appropriate scale may be selected and displayed according to whether the road information currently displayed is too dense or insufficiently dense, thereby providing the driver with useful road information. Road data analysis will be discussed in more detail later.

Figure 15:
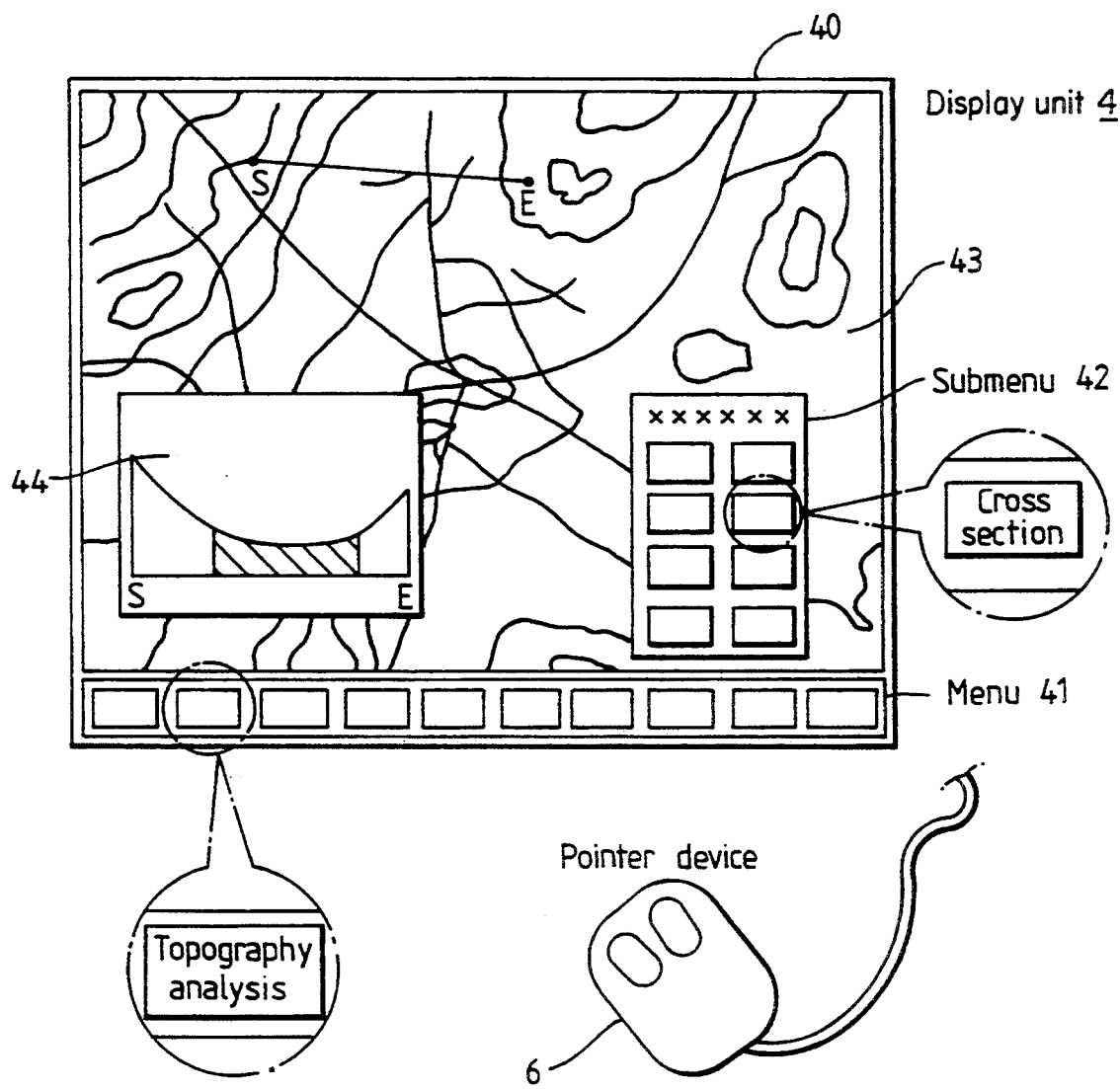
FIG. 15 illustrates schematically a display of a computer system for cross-sectional profile analysis according to the present invention.

Next, the operation and display procedure during the cross-sectional profile analysis discussed above will be explained. FIG. 15 shows a screen 40 of the display unit 4. The display unit 4 has a multiwindow function, which displays on the screen 40 a menu 41 showing function items such as topographic analysis and ground feature display, a submenu 42 listing lower level items for the item selected in the menu (such as cross-sectional analysis and viewing field analysis, for topographic analysis), a display field 43 showing the selected map, and another display field 44 showing the result of the analysis.

When the cross section of the ground surface is to be displayed in the above embodiment, an operator first selects a geographical feature display function on the menu 41 with the keyboard 5 or mouse 6 and enters items of topographic data he wants displayed (region, topographic map elements, etc.) to display a map showing the desired topographic data of the region being examined. The scale may be selected automatically according to the region specified. Then, the operator selects the topographic analysis item and the cross section item on the menu and submenu, respectively. Then the user selects, points (point S and point E) on the display field 43 to define a line for cross-sectional analysis. Then, the topographic analysis function 100 performs geographical cross-sectional analysis and displays information corresponding to the cross-section 44 in a window.

Further, analysis can be made using more than one mouse. Specifying the analysis points S and E with a first mouse A initiates the cross-sectional analysis on a scale corresponding to that of the map 43 currently displayed. A second mouse B may then be used to specify the analysis points can then adjust the amount of data to be used for the cross-sectional analysis according to the information density, as described in the above embodiment. The operator can choose either one of the two kinds of cross-sectional analysis or execute the two in parallel. In parallel processing, the mouse key may be held down to display the two cross sections obtained by the different types of analysis either side by side or alternately. This can also be achieved, by using specified commands on the submenu rather than by using mice.

Figure 16A:
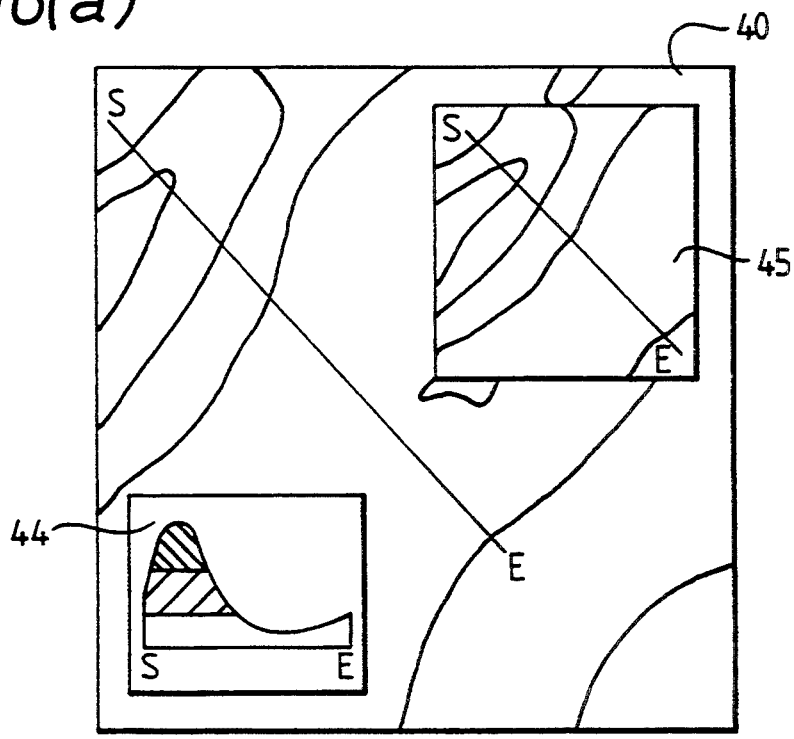
FIGS. 16(a) and 16(b) illustrate alternative displays corresponding to FIG.15.
Figure 16B:
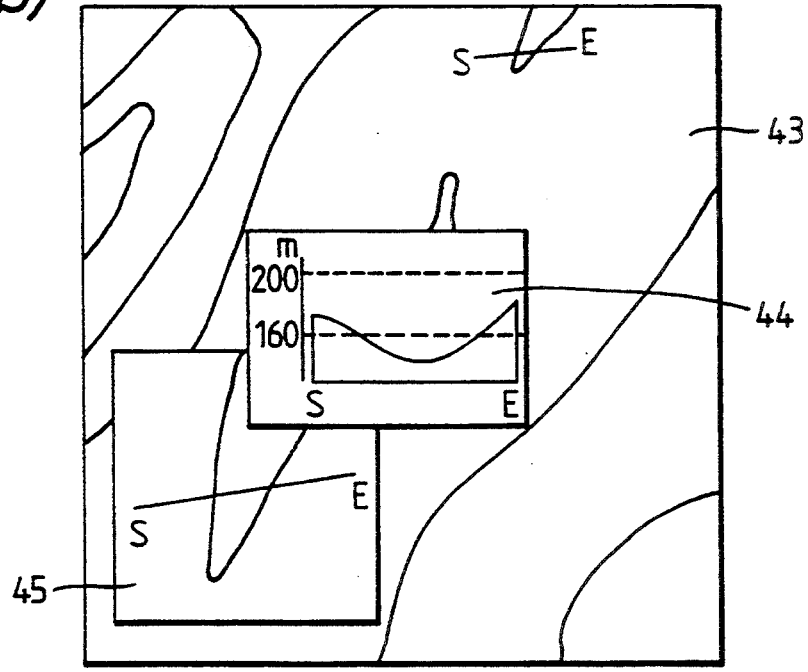

The result of the analysis of topographic data can be displayed in various modes by suitable control of the analysis conversion means 105. FIGS. 16(a) and 16(b) show examples of a display in which a map 43 and a cross section 44 are shown overlapped, using a window function. The window size of the cross section is set, by default, to about one fourth that of the map 43. When the distance of the analysis section between point S and point E on the screen is longer than the display size of the cross section as in FIG. 16(a) or when it is shorter than the cross section as in FIG. 16(b), the map in and around the part which is the subject of the analysis is reduced or enlarged so that the length of that part is almost equal to the size of the display of the cross section. Then the reduced or enlarged map is displayed in another window 45. This allows the operator to compare the map and the cross section on the same scale, which facilitates understanding of the cross section.

The window of the cross section can also be dragged to any desired position on the map 43 and displayed at any enlarged or reduced scale. In the cross-sectional display, additional contour information may be given different colors so that it is easily distinguishable from other information. Further, like a paper map that employs altitude coloring, the cross-section may be colored according to altitude, which allows an intuitive identification of altitude as well as a cross-sectional profile, as indicated in the cross section 44 of FIG. 16(a).

While the above description relates to an embodiment that determines the cross-section of the ground from the contour information, this method can also be applied to isopleth data (isobars, isotherms, etc.), the processing of which is similar to the processing of contour line data.

While this embodiment carries out cross-sectional profile analysis using line information (vector data), it is possible to use mesh data in producing the cross-section as follows by making information adjustment according to the density of the contour line data, as previously described.

The region is equally divided into blocks, and the data has a representative altitude value for a specified block or group of blocks. The interval between the blocks or the groups of blocks corresponds to the scale of the vector map. On the screen displaying the map, a desired section is specified for cross-sectional profile analysis. The altitude values of the blocks crossed by the line segment for analysis connecting point S and point E are processed in a similar manner to that previously described. Hence, the cross-section of the specified region can be determined and displayed. In this case, as with the block processing of FIG. 11, the number of altitude values required in each block (or group of blocks) is determined and, when it is found that n altitude values are necessary, block data that divides the block of the currently used data into regions is used for the cross-sectional analysis. This supplements the data in areas where the density of the altitude data is low.

Next, another embodiment will be described which uses topographic data elements other than contour lines for performing ground surface feature analysis. In addition to the contour lines, the topographic data elements may correspond to railways, roads, water systems, etc. These data, as with the contour lines, consists of lines as shown in FIG. 3.

Figure 17A:
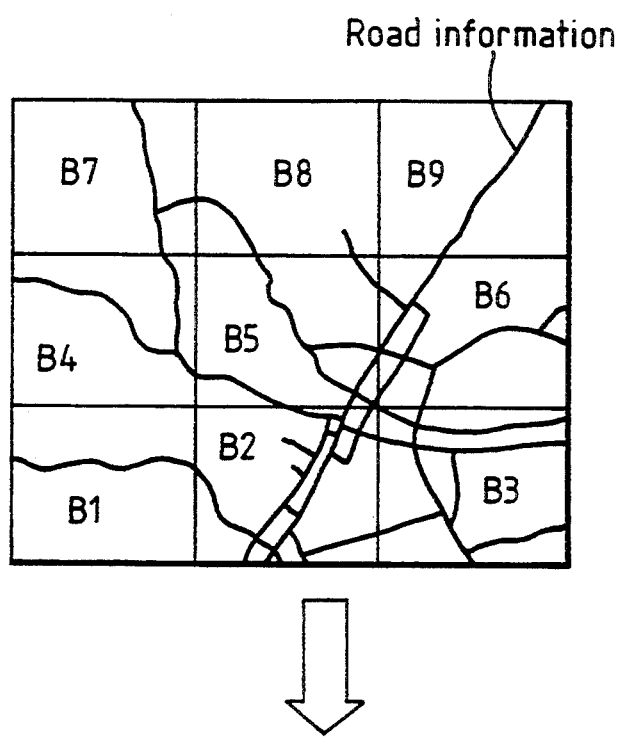
FIGS. 17(a) and 17(b) illustrate map analysis for determining the density of road data for analysis.
Figure 17B:
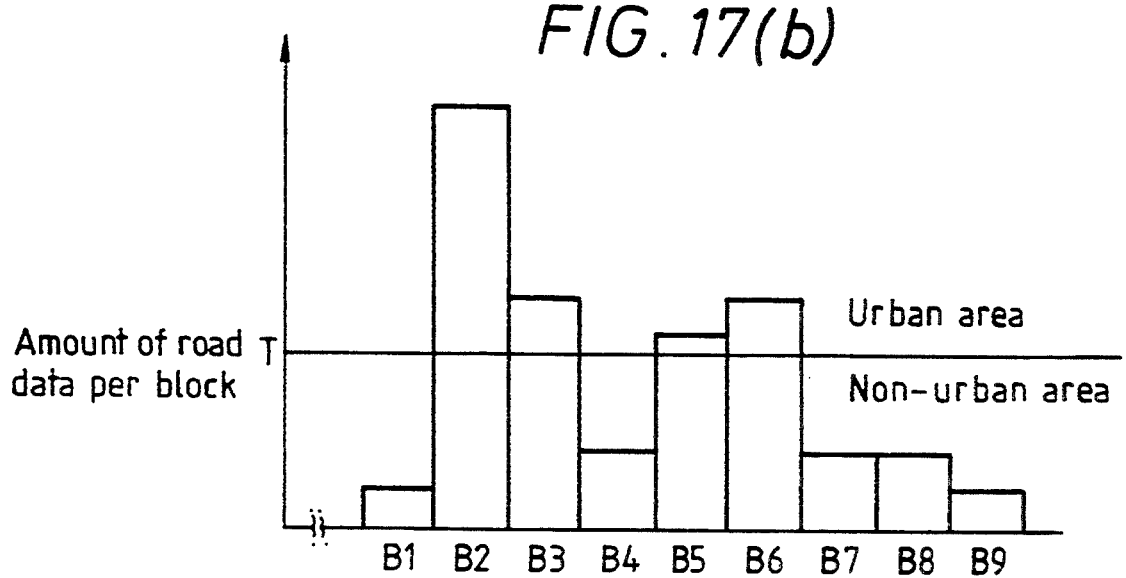

FIG. 17(a) shows road information in a relatively wide region including urban districts, fields, mountains and valleys. Suppose that an urban area is to be identified. First, using the road data for each block ($B_1$–$B_9$), the road distribution is determined. The density of road data is determined from the information number m contained in a unit part (road) of FIG. 4. The threshold value T for the line density is pre-set. For each block, a check is made to see if the density of the road data exceeds the threshold value T. If the threshold value T is exceeded, the block may be identified as an urban area; when it is not exceeded, the block is identified as a non-urban area. The data is then stored in memory. In this case, when the road density of all blocks or a particular block (or specified block), is below the threshold value T, road data corresponding to a map of larger scale may be selected to supplement the road information in all the blocks or the specified block. The process of selection may be the same as with an embodiment that uses contour lines (as in FIG. 10(b), for example).

Figure 18A:
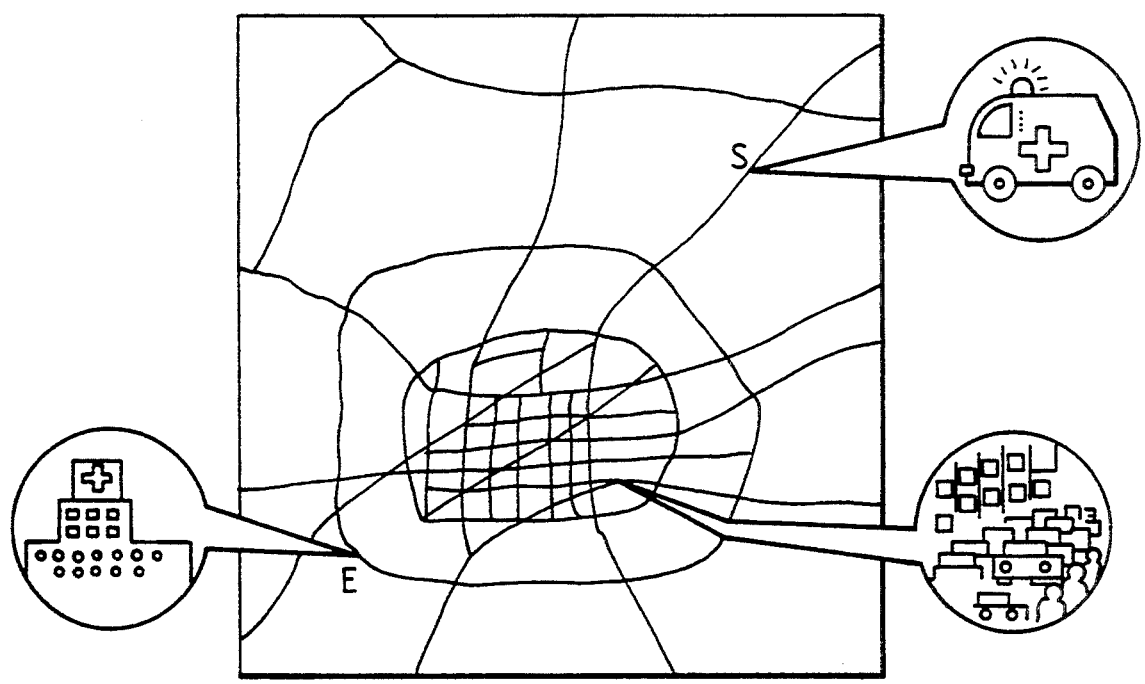
FIGS. 18(a) and 18(b) show a further embodiment in which the present invention is applied to route analysis.
Figure 18B:
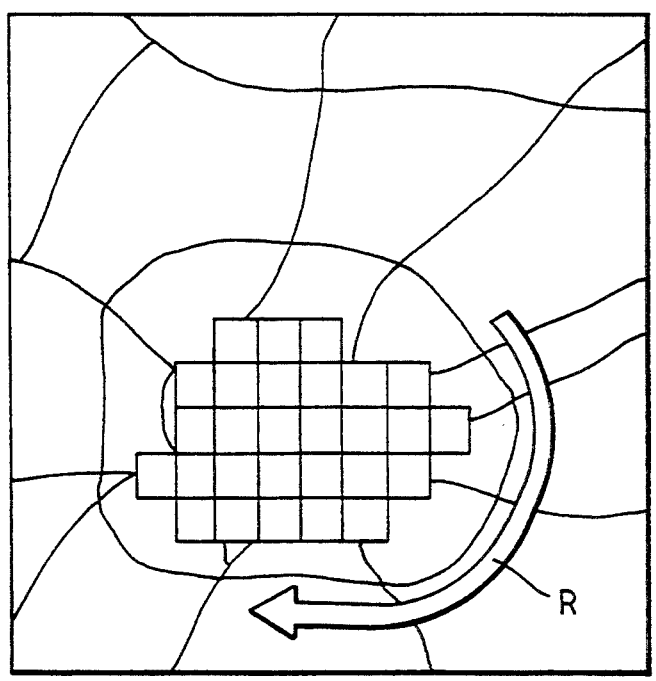

Using road data whose density is suitably determined, as discussed above, the best route may be determined for a vehicle to reach a destination (for instance, in the event of a disaster). FIG. 18 shows an example of such a display. In determining the route of an ambulance from a start point S to a destination point E in FIG. 18(a), the road distribution is investigated to find whether or not each block is an urban area, and the result is assigned as an attribute for each block. The route planning is performed according to a known shortest distance search method. The route R in FIG. 18(b) is displayed as a suggested route to avoid congested roads in blocks identified as urban.

Thus, although the map displayed by the display in FIG. 18(a) is at a relatively small scale, so that the information is clear, use is made of data corresponding to a map of larger scale in order to determine whether a block is an urban area, prior to the processing which determines the route R. Of course, in some blocks, the road density of the displayed map may be sufficiently large that the block may be identified immediately as an urban area, without needing to check with map data of the corresponding block of a map of larger scale.

Figure 19A:
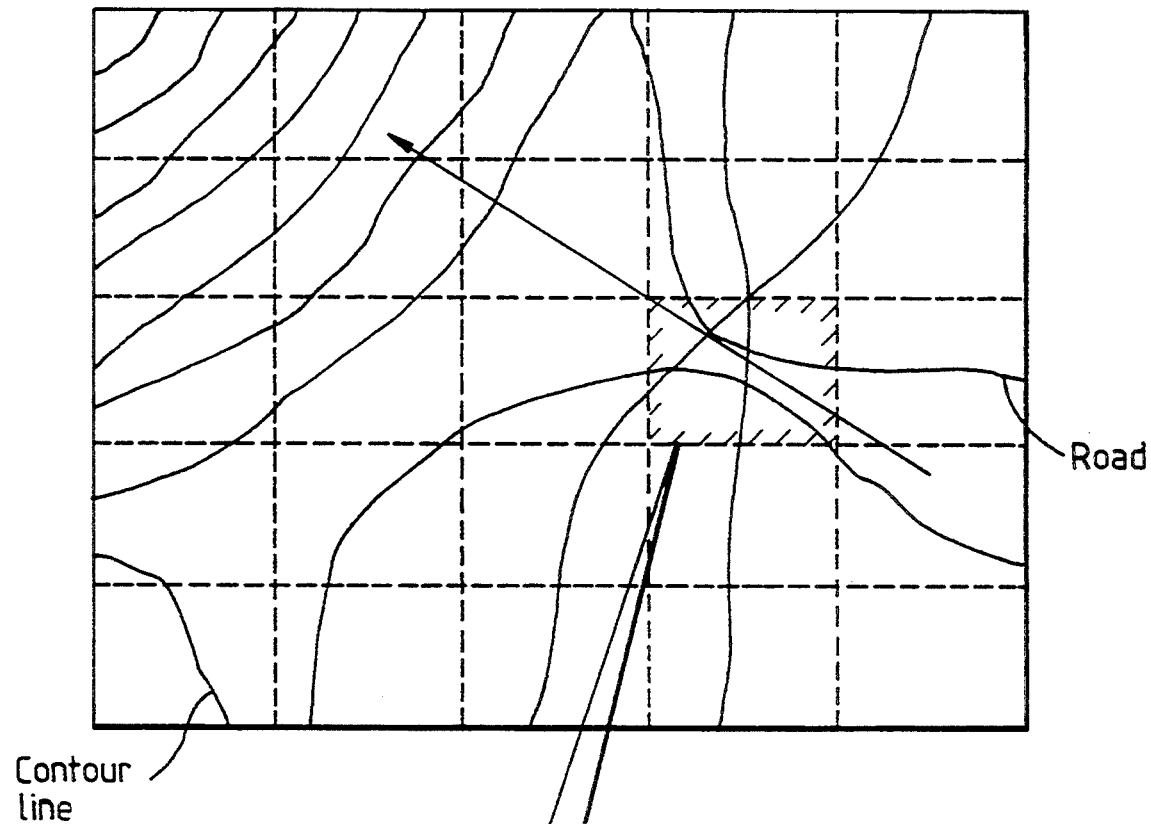
FIGS. 19(a) and 19(b) illustrate another embodiment of the present invention, in which building data is used in addition to contour data to produce sight line analysis.
Figure 19B:
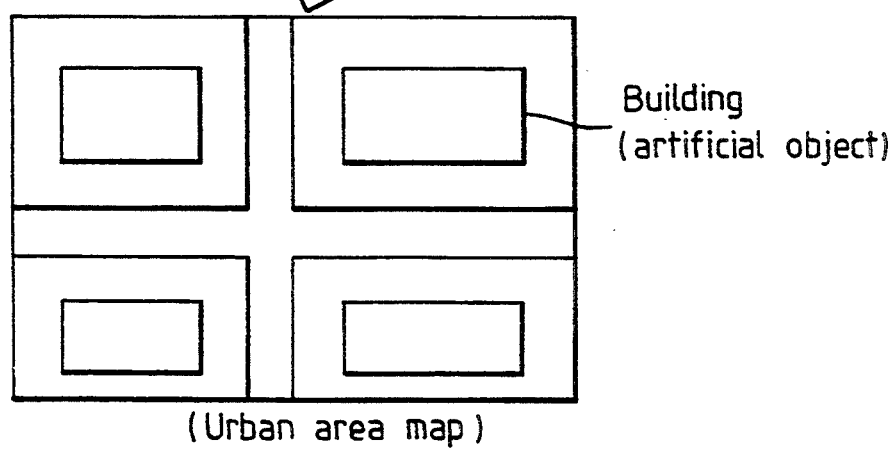

FIG. 19 and 20 show further embodiments illustrating the application of the present invention to viewing field or sight line analysis. In general topographic displays of maps, the ground relief is included in scales of 1/25,000 to 1/500,000. The data relating to artificial objects (buildings) obstructing the view is only included for scales greater than one several thousandth. Analysis of the view from point S toward point E in FIG. 19(a) involves selecting artificial object data in the block by a unit information index $C_i$ and performing cross-sectional analysis along the line from point S to point E based on this artificial object data, in addition to making a cross-sectional profile analysis of the ground surface based on contour information. As shown in the map of an urban area, in FIG. 19(b), the artificial object data includes building data as line data to which is added representative height data for the buildings.

Figure 20A:
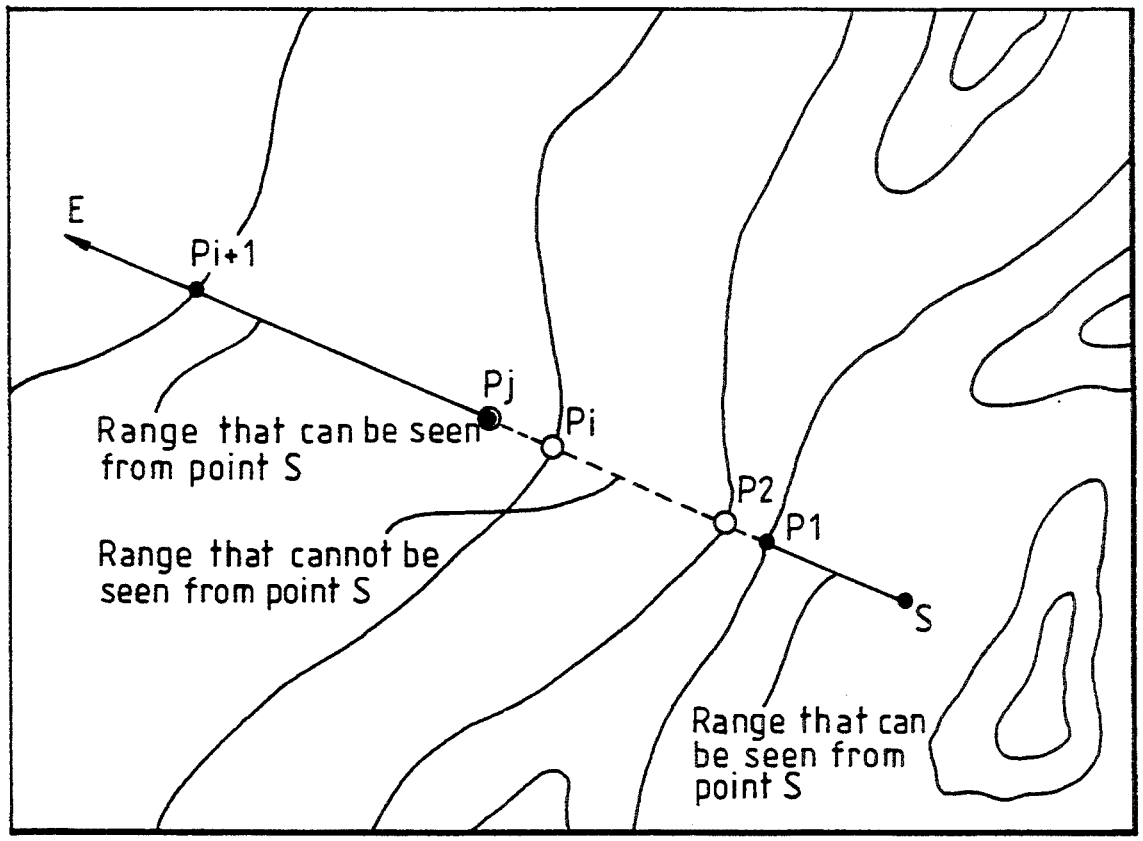
FIGS. 20(a) and 20(b) illustrate processing for deriving sight line analysis.
Figure 20B:
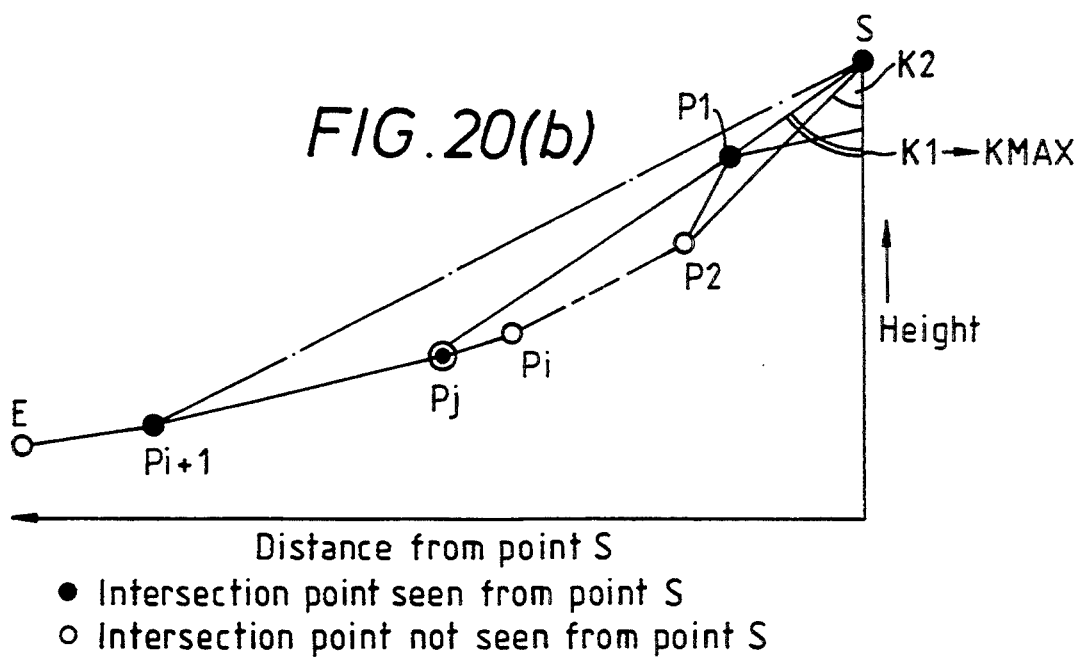

FIGS. 20(a) and 20(b) show the method of analyzing the view (viewing field). First, the height of point S specified by an operator is determined. In FIG. 20(a) the point S is higher than point E. Next, the positions and heights of the intersection points $P_i$ where the line segment connecting point S and point E crosses a contour line are determined. Then, for the blocks in the region being considered which have artificial object data (identified by the presence or absence of index $C_j$), the positions and heights of intersection points where the line segment SE crosses lines derived from the building data are determined. The building data forms lines that represent plane surfaces of a building, like contour lines, and supplementary data that represent the heights of the buildings and the altitude of the ground where the buildings stand. The intersections with building lines thus obtained are added to the contour line intersections. If the view analysis region is limited to an urban area, only intersections with buildings may need to be considered.

As shown in FIG. 20(b), for point $P_1$ which, for the intersection points obtained, is the closest to the point S, the viewing angle $K_1$ from point S is determined using the distance to point S, the height of intersection $P_1$ and the height of point S. (The viewing angle is taken to be zero degrees for the vertically downward direction and 180 degrees for the vertically upward direction.) Here, the maximum viewing angle $K_{max}$ is set to be $K_1$. For the intersection point $P_2$, the viewing angle $K_2$ from point S is determined. When the viewing angle $K_2$ is smaller than the maximum viewing angle $K_{max}$, then the view is obscured over the viewing angle from $K_1$ to $K_2$. When the viewing angle $K_2$ is greater than the maximum view angle $K_{max}$, the view is not obscured over the viewing angle from $K_1$ to $K_2$. Then, the maximum viewing angle $K_{max}$ is updated to $K_2$. Generally, when an intersection point $P_i$ which cannot be seen is followed by an intersecting point $P_i$ which can be seen, a line is drawn connecting the points $P_i$ and $P_i$ to intersect the line extending from point S in the direction of the maximum viewing angle $K_{max}$ and obtain an intersection point $P_j$. It then follows that there is an obstructed view in the range from point $P_i$ to $P_j$ but an unobstructed view in the range from point $P_i$ to $P_{i+1}$. As shown in the screen display of FIG. 20(a), the viewing line comprises solid line segments and broken line segments, corresponding to non-obscured and obscured regions. Hence, a decision about the view can be made for all the intersection points.

In this way, the analysis of a view taken from any desired point can be carried out using the contour data and building data, and can be utilized, for example, for investigating barriers for obstructions to radio or television transmission.

It can also be seen that the viewing angle analysis of FIGS. 20(a) and 20(b) may be applied to a map of non-geographical data such as a floor plan. For a complex floor plan, it may be desired to display more information (e g. the positions of furniture items) on one map, as compared with another. When calculating lines of sight within the building, however, for a map showing relatively little information, it may then be necessary to make use of data corresponding to a map of more information, hence making use of the present invention. Therefore, the present invention is not limited to geographical maps, but may be applied to other maps (which term includes plans and charts) representing two-dimensional areas.

Figure 21:
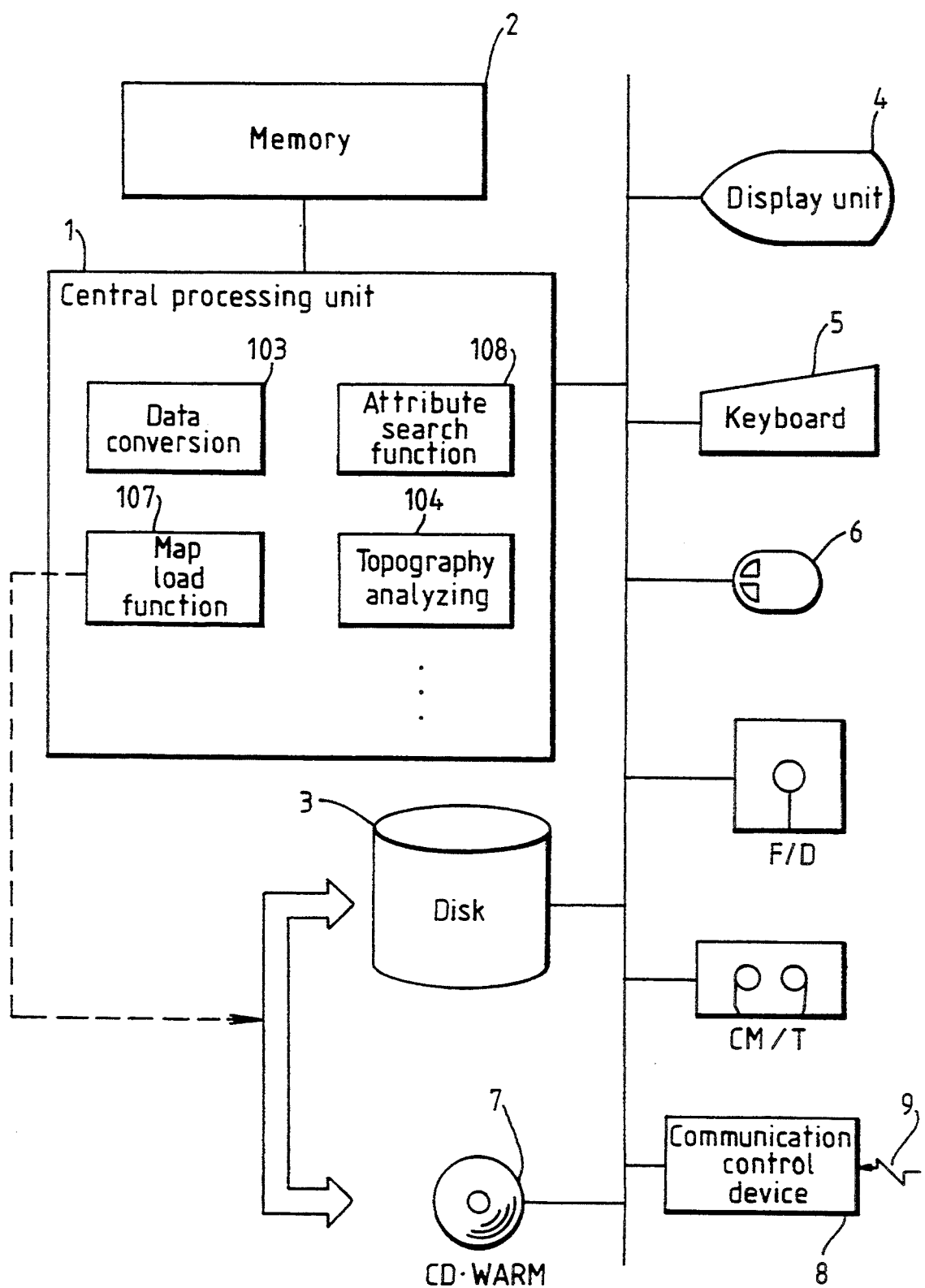
FIG. 21 is a block diagram of a map terminal in which the present invention may be embodied.

FIG. 21 shows the configuration of a geographical information system (usually called a map terminal), being an apparatus to which the present invention may be applied. In FIG. 21, components having the same or similar functions to those of the apparatus of FIG. 2 are given the same reference numerals.

In addition to the topographic data processing function (display of maps and analysis to generate topographic information), the map terminal has many other functions, such as an attribute search function 108 which lets an operator pick a desired symbol on the displayed map to input and output its attributes. It also has a map loading function 107 that loads a large amount of map data to allow for versatility of the terminal.

Since the topographic data includes general map data as well as unit data and attribute data and is very large in amount, it is divided and managed by areas. The topographic data may, for example, be stored in area-specific compact disks (CD) or write once read many disks (WORM) or any bulk storage device. The map loading function selects the topographic data for an area specified by the operator from a large number of CDs and WORMs 7 and transfers it to a disk device 3 or stores the topographic data added with attributes given by the terminal in the corresponding CDs or WORMs 7. These topographic data may be processed by standalone equipment using a plurality of CDs and WORMs or may be retrieved from an external database in a networked system 9 through a communication control device 8.

The map terminal of this embodiment has a topography analyzing means 104 which automatically selects topographic data of a map of an appropriate scale different from that of the currently displayed map, thereby producing highly precise analysis. In such a processing system, the provision of the map loading function, which can handle a huge volume of topographic data for maps of multiple scales simultaneously, assures effective operation of the system.

With this invention, since the distribution of topographic data in a region being analyzed is determined and optimized according to the purpose of processing, the precision of information analysis can be improved and the display quality of information also improved or homogenized, thus providing a user with adequate information.

The topographic analysis of this invention determines an area in the region being analyzed where the amount of topographic information is not sufficient, and then makes use of additional topographic data of a map of a different scale and attribute data, thus improving the accuracy of e g. cross-sectional profile analysis and view analysis.

Having disclosed the best mode of my invention, there may be alternative embodiments cognizable to persons skilled in the art. This disclosure is intended to cover all embodiments within the spirit of the invention.

What is claimed is:

1. A computer apparatus for topographic processing comprising:
   storage means for storing a plurality of different topographic map data relating to a same region of a map;
   selection means for selecting a first one of said different topographic map data;
   analysis means for selecting partial data of said first one of said different topographic map data relating to a part of the same region, analyzing said partial data of said first one of said different topographic map data in order to determine whether a density of said partial data of said first one of said different topographic map data is more than a predetermined density threshold, and generating the partial data of said first one of said different topographic map data when said density is more than said predetermined density threshold and generating other partial data of a second one of said different topographic map data when said density is not more than said predetermined threshold; and display means for displaying a contour of altitude relating to the topographic map data in the same region of the map based on either one of the partial data and the other partial data guarantee by said analysis means.

2. A computer apparatus according to claim 1, wherein said analysis means generates further information which is provided in addition to the displayed topographic data, and said display means displays said further information.

3. A computer apparatus according to claim 2, wherein said display means simultaneously displays said contour of altitude relating to the topographic map data and at least a part of said further information.

4. An apparatus according to claim 1, wherein said plurality of maps are of respectively different scales, and said first one of said maps has a smaller scale than said second one of said maps.

5. A computer apparatus according to claim 1, further including means for generating interpolation contour information corresponding to said part of said first one of said plurality of different topographic map data, and for analyzing said interpolation contour information to generate additional information which is provided in addition to the displayed topographic data, said display means displays said additional information.

6. A computer apparatus for topographic processing comprising:
   storage means for storing a plurality of different topographic map data relating to a same region of a map;
   selection means for selecting a first one of said different topographic map data;
   analysis means for selecting partial data of said first one of said different topographic map data relating to a part of the same region, analyzing a part of the same region data to determine whether a density of said partial data of said first one of said different topographic map data is more than a predetermined density threshold, and generating the partial data of said first one of said different topographic map data when said density is more than said predetermined density threshold and generating other partial data of a second one of said different topographic map data when said density is not more than said predetermined threshold; and
   display means for displaying said information;
   wherein said analysis means divides said part of said first map into a plurality of sub-regions, and determines whether said sub-regions have a density of the map data more than said predetermined threshold, such that said part of said second one of said plurality of maps corresponds to any one of said plurality of sub-regions for which said density of the map data is more than said predetermined density threshold.

7. A computer apparatus for topographic processing comprising:
   means for storing a plurality of different topographic map data relating to a same region of a map;
   means for selecting a first map of said different topographic map data;
   means for selecting a part of said first one of said different topographic map data relating to a part of the same region, dividing said part of said first map of said different topographic map data into a plurality of sub-regions, and investigating the density of map data of said plurality of sub-regions of said part of said first map of said different topographic map data;
   automatic investigation means, responsive to when the density of map data of any one of said plurality of sub-regions is not higher than a predetermined density threshold, for automatically investigating the map data of a part of a second map of said different topographic map data, said part of said second map corresponding to said any one of said plurality of sub-regions of said first map of said different topographic map data; and
   means for generating a display of information combining data from said part of said second one of said different topographic map data and said plurality of sub-regions of said first one of said different topographic map data other than any one of said plurality of sub-regions for which the density of map data of said any one of said plurality of sub-regions is not higher than said predetermined density threshold.

8. A computer apparatus for topographic processing comprising:
   means for storing a plurality of different topographic map data relating to a same region of a map, the map data of said plurality of different topographic map data having respectively different densities of topographic information and including contour data defining a plurality of contours;
   means for defining a line on a selected first one of said different topographic map data for contour information display;
   means for defining a plurality of sub-regions of said line;
   means for investigating said sub-regions of said line to determine which of said sub-regions have contour data higher than a predetermined density threshold;
   means for investigating part of a second one of said different topographic map data, said part corresponding to any of said sub-regions of said line for which said contour data is lower than said predetermined density threshold;
   means for generating contour information corresponding to said line by analysis based on data of those sub-regions of said first of said different topographic map data intersected by said line for which the contour data is higher than said predetermined threshold and contour data of said part of said second one of said different topographic map data; and
   means for displaying said contour information.

9. A computer apparatus for topographic processing, comprising:
   means for storing at least one different topographic map data relating to a same region of a map, said different topographic map data including contour data;
   means for defining a line on said at least one different topographic map for contour information display;

means for defining a plurality of sub-regions of said line;

means for investigating said sub-regions of said line to determine which of said sub-regions have contour information higher than a predetermined density threshold;

means for generating interpolation contour information corresponding to said line for those of said sub-regions for which the contour information is not higher than said predetermined threshold;

means for generating contour information corresponding to said line by analysis based on said interpolation contour information and contour information from each of said sub-regions of said line; and means for displaying said contour information.

10. A method of topographic processing, said method comprising the steps of:

storing a plurality of different topographic map data relating to a same region of a map;

selecting a first one of said different topographic map data;

selecting partial data of said first one of said different topographic map data relating to a part of the same region;

analyzing said partial data of said first one of said different topographic map data in order to determine whether a density of said partial data of said first one of said different topographic map data is more than a predetermined density threshold;

generating the partial data of said first one of said different topographic map data when said density is more than said predetermined density threshold; and generating other partial data of a second one of said different topographic map data when said density is not more than said predetermined density threshold;

wherein the analyzing step includes the sub-steps of:

dividing said partial data of said first one of said different topographic map data into a plurality of sub-regions and determining whether the density of map data of each sub-region is more than said predetermined density threshold; and wherein said partial data of said second one of said different topographic map data corresponds to any of said plurality of sub-regions for which the density of the map data is more than said predetermined density threshold.

11. A method according to claim 10, wherein said partial data of said first one of said different topographic map data is a line.

12. A method according to claim 11, wherein said map data includes contour data defining a plurality of contours, and said predetermined threshold corresponds to a minimum number of intersections of contours with said line for each sub-region.

13. A method of topographic processing comprising:

storing a plurality of different map data relating to a same region of a map;

selecting a part of a first one of said different topographic map data;

dividing said part of said first one of said different topographic map data into a plurality of sub-regions;

investigating the map data of each of said sub-regions to determine whether the density of said map data of each sub-region is higher than a predetermined density threshold;

for each sub-region for which the density of said map data is not higher than said predetermined density threshold, investigating the map data of a corresponding part of a second one of said different topographic map data; and generating a display of information combining data from said part of said second one of said different topographic map data, and said plurality of sub-regions of said first one of said different topographic map data other than any one of said plurality of sub-regions for which the density of the map data is not higher than said predetermined density threshold.

14. A method of topographic processing, comprising:

storing a plurality of different topographic map data, the different topographic map data being of respectively different densities of topographic information and including contour information defining a plurality of contours;

defining a line on a first one of said different topographic map data for contour information display;

defining a plurality of sub-regions of said line;

investigating the map data of each of said sub-regions to determine whether the contour data thereof is higher than a predetermined density threshold;

generating interpolation contour information corresponding to said line for those of said sub-regions for which the contour information is not higher than said predetermined threshold;

for each of said sub-regions for which the contour information is not higher than said predetermined density threshold, determining a corresponding part of a second one of said different topographic map data;

generating contour information corresponding to said line by analysis of contour information of each of said sub-regions for which the contour information satisfies said predetermined threshold and contour information of said parts of said second one of said different topographic map data; and displaying said contour information.

15. A method of topographic processing, comprising:

storing at least one map of map data, said map data including contour data;

defining a line on said at least one map for contour information display;

defining a plurality of sub-regions of said line;

investigating the map data of each of said sub-regions to determine whether the contour data is higher than a predetermined threshold;

for each sub-region for which the contour data does not satisfy said predetermined threshold, generating interpolation contour data;

generating contour information corresponding to said line by analysis based on said interpolation contour data and contour data from each of said sub-regions of said line; and displaying said contour information.

* * * * *